(12) United States Patent
Lei et al.

(10) Patent No.: US 11,036,951 B2
(45) Date of Patent: Jun. 15, 2021

(54) ARCHITECTURE FOR FASTER DECODING IN A BARCODE READING SYSTEM THAT INCLUDES A SLOW INTERFACE BETWEEN THE CAMERA AND DECODER

(71) Applicant: The Code Corporation, Draper, UT (US)

(72) Inventors: Ming Lei, Taylorsville, NJ (US); Jason Lee, Concord, MA (US)

(73) Assignee: The Code Corporation, Murray, UT (US)

( * ) Notice: Subject to any disclaimer, the term of this patent is extended or adjusted under 35 U.S.C. 154(b) by 0 days.

(21) Appl. No.: 16/730,801

(22) Filed: Dec. 30, 2019

(65) Prior Publication Data

US 2020/0387683 A1 Dec. 10, 2020

Related U.S. Application Data

(63) Continuation of application No. 15/828,135, filed on Nov. 30, 2017, now Pat. No. 10,521,635, which is a (Continued)

(51) Int. Cl.
*G06K 7/10* (2006.01)
*G06K 7/14* (2006.01)

(52) U.S. Cl.
CPC ......... *G06K 7/146* (2013.01); *G06K 7/10722* (2013.01); *G06K 7/10732* (2013.01); (Continued)

(58) Field of Classification Search
CPC ................ G06K 7/10722; G06K 7/10851
(Continued)

(56) References Cited

U.S. PATENT DOCUMENTS 8,162,218 B2 4/2012 Meier
8,750,637 B2 6/2014 Stroem
(Continued)

FOREIGN PATENT DOCUMENTS

| CN | 203838715 U | 9/2014 |
|---|---|---|
| JP | 2004032507 A | 1/2004 |
| WO | 2015083979 | 6/2015 |

*Primary Examiner* — Toan C Ly
(74) *Attorney, Agent, or Firm* — Timothy P. O'Hagan; Ray Quinney & Nebeker

(57) ABSTRACT

Disclosed herein is a barcode reading system that includes an image decoding system, a communication interface, and an image sensor system package. The image decoding system may include a processor, memory, and a decoder stored in the memory. The image sensor system package may be coupled to the image decoding system via the communication interface. The image sensor system package may include a photo sensor array and pre-processing circuitry. The photo sensor array may be configured to capture image frames at a first speed. The pre-processing circuitry may be configured to perform one or more operations on the image frames captured by the photo sensor array. The pre-processing circuitry may be additionally configured to effect transfer of at least some of the image frames to the image decoding system via the communication interface at a second speed. The first speed may be greater than the second speed.

20 Claims, 28 Drawing Sheets

Related U.S. Application Data continuation-in-part of application No. 15/676,397, filed on Aug. 14, 2017, now Pat. No. 10,121,041, which is a continuation of application No. 14/717,193, filed on May 20, 2015, now Pat. No. 9,734,374.

(60) Provisional application No. 62/154,066, filed on Apr. 28, 2015.

(52) U.S. Cl.
CPC ..... *G06K 7/10752* (2013.01); *G06K 7/10792* (2013.01); *G06K 7/10851* (2013.01); *G06K 7/1465* (2013.01)

(58) Field of Classification Search
USPC .................................. 235/462.27, 462.41
See application file for complete search history.

(56) References Cited

U.S. PATENT DOCUMENTS

| | | |
|---|---|---|
| 9,257,396 B2 | 2/2016 | Uzoh |
| 9,696,612 B2 | 7/2017 | Anderson |
| 2003/0025822 A1 | 2/2003 | Shimada |
| 2003/0030923 A1 | 2/2003 | Hsu |
| 2004/0056956 A1 | 3/2004 | Gardiner et al. |
| 2006/0131419 A1 | 6/2006 | Nunnik |
| 2006/0284987 A1 | 12/2006 | Wolf, II |
| 2007/0158220 A1 | 7/2007 | Cleereman et al. |
| 2007/0164115 A1* | 7/2007 | Joseph ............... G06K 7/10722 235/462.21 |
| 2007/0205287 A1 | 9/2007 | Tien |
| 2008/0094482 A1* | 4/2008 | Yoshimura ......... H04N 5/23232 348/222.1 |
| 2008/0142599 A1 | 6/2008 | Benillouche |
| 2012/0061462 A1 | 3/2012 | Shadwell |
| 2013/0109316 A1 | 5/2013 | Lee |
| 2013/0155253 A1 | 6/2013 | Wood |
| 2013/0155474 A1* | 6/2013 | Roach ...................... G06K 9/42 358/505 |
| 2014/0017955 A1 | 1/2014 | Lo |
| 2014/0171150 A1 | 6/2014 | Hurst et al. |
| 2014/0313377 A1 | 10/2014 | Hampton |
| 2014/0327815 A1 | 11/2014 | Auger |
| 2015/0043805 A1* | 2/2015 | Sakamoto ................ G06K 9/52 382/151 |
| 2015/0126244 A1 | 5/2015 | Moran |
| 2015/0126245 A1 | 5/2015 | Barkan et al. |
| 2015/0317503 A1 | 11/2015 | Powell |
| 2016/0012269 A1 | 1/2016 | Kowalczyk et al. |
| 2016/0104016 A1 | 4/2016 | Deal |
| 2016/0104017 A1 | 4/2016 | Deal |
| 2016/0171357 A1 | 6/2016 | Kwon |
| 2016/0180128 A1 | 6/2016 | Utykanski |
| 2016/0180129 A1 | 6/2016 | Utykanski |
| 2016/0188932 A1 | 6/2016 | Powell |
| 2016/0188933 A1 | 6/2016 | Powell |
| 2016/0188934 A1 | 6/2016 | Powell |
| 2016/0232389 A1 | 8/2016 | Gifford |
| 2016/0321483 A1 | 11/2016 | Utykanski |
| 2016/0321485 A1 | 11/2016 | Utykanski |
| 2016/0373629 A1 | 12/2016 | Jung |
| 2017/0004340 A1 | 1/2017 | Powell |

\* cited by examiner

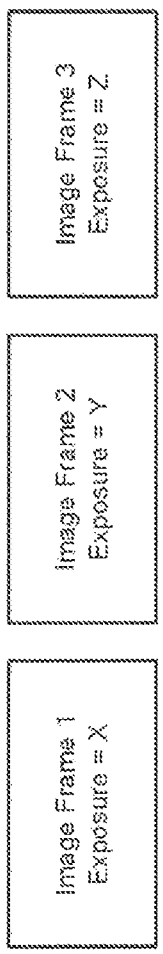
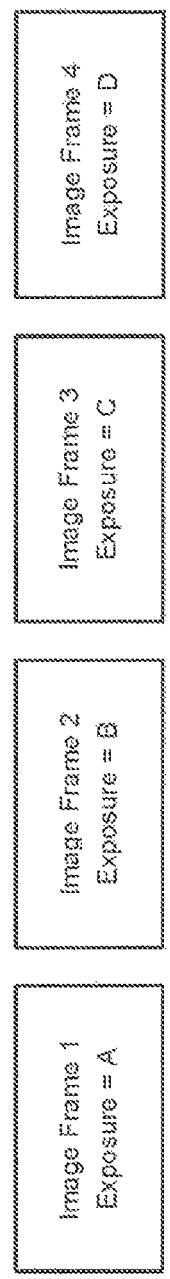

| Exemplary Derivatives of a Frame of Image Data Produced by Permutations of Preprocessing Circuits or an Image Processing Module |
|---|
| Full Frame |
| Binning of a Full Frame or a Window of a Full Frame (Average Digital Values) |
| Sub-Sample of a Full Frame for a Window of a Full Frame |
| Rotation of Full Frame, a Window of a Full Frame or Binned Full Frame or Window of a Full Frame. (All Columns or Sub-Sampled Selected Columns/Rows) |
| Convolution of Full Frame, a Window of a Full Frame, a Binned Full Frame or Window of a Full Frame, or a Sub-Sampled Full Frame of Window of Full Frame (Selected One of Multiple Kernels) |
| Double Convolution of Full Frame, a Window of a Full Frame, a Binned Full Frame or Window of a Full Frame, or a Sub-Sampled Full Frame of Window of a Full Frame (Two Distinct Kernels Applied Sequentially) |

FIG. 8

Group ID ~ 740
    License ID ~ 742
        Qty. Purchased : XX ~ 744
        Qty. Used     : YY ~ 746
        Qty. Remaining : ZZ ~ 748

Group ID ~ 750
    License ID ~ 752a
        Qty. Purchased : Unlimited ~ 754a
        Qty. In Use    : N/A ~ 756a
        Qty. Remaining : N/A ~ 758a
    License ID ~ 752b
        Qty. Purchased : XX ~ 754b
        Qty. In Use    : YY
        Qty. Remaining : ZZ 756b
758b

| ID | Expire |
|---|---|
| 1 | MM/DD |
| 2 | MM/DD |
| 3 | MM/DD |
| 4 | MM/DD |
| 5 | MM/DD |
| 6 | MM/DD |
| 7 | MM/DD |
| 8 | MM/DD |

FIG. 14C

ARCHITECTURE FOR FASTER DECODING IN A BARCODE READING SYSTEM THAT INCLUDES A SLOW INTERFACE BETWEEN THE CAMERA AND DECODER

CLAIM OF PRIORITY

This application is a continuation of U.S. patent application Ser. No. 15/828,135 (the '135 application) filed Nov. 30, 2017. The '135 application is a continuation-in-part of U.S. patent application Ser. No. 15/676,397 filed Aug. 14, 2017, and issued as U.S. Pat. No. 10,121,041 (the '041 patent) on Nov. 6, 2018. The '041 patent is a continuation of U.S. patent application Ser. No. 14/717,193 filed May 20, 2015, issued as U.S. Pat. No. 9,734,374 (the '374 patent) on Aug. 15, 2017. The '374 patent claims priority to provisional U.S. Patent Application No. 62/154,066 filed Apr. 28, 2015. This application claims priority from all of the applications listed above, which are incorporated by reference as if fully set forth herein.

TECHNICAL FIELD

The present disclosure relates generally to a barcode reader. More specifically, the present disclosure relates to a barcode reader that includes multiple illumination systems and multiple sets of imaging optics.

BACKGROUND

A barcode is an optical machine-readable representation of information. Devices for identifying or extracting information from barcodes are generally referred to as barcode readers (or barcode scanners). An image-based barcode reader includes a camera for capturing an image of a barcode to be read. The camera includes a focusing lens that focuses light reflected from a target area onto a photo sensor array. Once an image of a barcode has been captured by the camera, a decoder processes the image and extracts the information contained in the barcode.

SUMMARY

In accordance with an aspect of the present disclosure, a barcode reading system is disclosed that includes an image decoding system, a communication interface, and an image sensor system package. The image decoding system may include a processor, memory, and a decoder stored in the memory. The image sensor system package may be coupled to the image decoding system via the communication interface. The image sensor system package may include a photo sensor array and pre-processing circuitry. The photo sensor array may be configured to capture image frames at a first speed. The pre-processing circuitry may be configured to perform one or more operations on the image frames captured by the photo sensor array. The pre-processing circuitry may be additionally configured to effect transfer of at least some of the image frames to the image decoding system via the communication interface at a second speed. The first speed may be greater than the second speed.

The one or more operations performed by the pre-processing circuitry may include determining whether the image frames satisfy a threshold quality level. The pre-processing circuitry may be additionally configured to effect transfer of the image frames that satisfy the threshold quality level to the image decoding system, and to discard the image frames that do not satisfy the threshold quality level without transferring them to the image decoding system.

In some embodiments, the pre-processing circuitry may be additionally configured to set image capture parameter values for the photo sensor array. In other embodiments, however, the pre-processing circuitry may be configured so that it does not set image capture parameter values for the photo sensor array. In such embodiments, the image sensor system package may further include an automatic gain control system that sets the image capture parameter values for the photo sensor array.

Determining whether an image frame satisfies the threshold quality level may include determining whether a sharpness of the image frame exceeds a sharpness threshold and determining whether a contrast of the image frame exceeds a contrast threshold.

In some embodiments, effecting transfer of the image frames that satisfy the threshold quality level to the image decoding system may include sending the image frames that satisfy the threshold quality level to the image decoding system via the communication interface.

Alternatively, the image decoding system may be configured so that it does not request any image frames until it receives a ready signal. Effecting transfer of an image frame to the image decoding system may include sending the ready signal to the image decoding system.

In other embodiments, the image sensor system package may further include control circuitry and an image buffer. The control circuitry may be configured to transfer any image frames that are stored in the image buffer to the image decoding system. Effecting transfer of an image frame to the image decoding system may include transferring the image frame to the image buffer.

In accordance with another aspect of the present disclosure, a barcode reading system is disclosed that includes an image decoding system, a communication interface, a camera, and pre-processing circuitry. The image decoding system may include a processor, memory, and a decoder stored in the memory. The camera may be coupled to the image decoding system via the communication interface. The camera may include a photo sensor array that is configured to capture image frames. The pre-processing circuitry may be configured to perform one or more operations on the image frames captured by the photo sensor array and to effect transfer of at least some of the image frames to the image decoding system via the communication interface based on image quality.

Effecting transfer of the image frames that satisfy the threshold quality level to the image decoding system may include at least one of i) directly sending the image frames that satisfy the threshold quality level to the image decoding system, or ii) taking an action that causes the image frames that satisfy the threshold quality level to be sent to the image decoding system.

In accordance with another aspect of the present disclosure, a barcode reading system is disclosed that includes an image decoding system comprising a processor, memory, and a decoder stored in the memory. The barcode reading system may also include a communication interface. A camera may be coupled to the image decoding system via the communication interface. The camera may include a photo sensor array that is configured to capture image frames. The barcode reading system may also include circuitry configured to selectively transfer image frames to the image decoding system.

In some embodiments, selectively transferring the image frames to the image decoding system may include determining whether the image frames satisfy a threshold quality level, effecting transfer of the image frames that satisfy the threshold quality level to the image decoding system, and discarding the image frames that do not satisfy the threshold quality level without transferring them to the image decoding system.

In some embodiments, determining whether the image frames satisfy the threshold quality level may include evaluating a metric provided by the photo sensor array.

In some embodiments, the circuitry may additionally be configured to set image capture parameter values for the photo sensor array. Alternatively, the circuitry may be configured so that it does not set image capture parameter values for the photo sensor array, and the barcode reading system may further include an automatic gain control system that sets the image capture parameter values for the photo sensor array.

In some embodiments, determining whether an image frame satisfies the threshold quality level may include determining whether a sharpness of the image frame exceeds a sharpness threshold, and determining whether a contrast of the image frame exceeds a contrast threshold.

In some embodiments, effecting transfer of the image frames that satisfy the threshold quality level to the image decoding system may include at least one of directly sending the image frames that satisfy the threshold quality level to the image decoding system, or taking an action that causes the image frames that satisfy the threshold quality level to be sent to the image decoding system.

In some embodiments, the circuitry is configured to dynamically adjust a frame rate of image transfer. Alternatively, or in addition, the circuitry may additionally be configured to filter at least some of the image frames. Alternatively, or in addition, the circuitry may be configured to replace at least some image blocks with pre-identified data.

BRIEF DESCRIPTION OF THE DRAWINGS

FIGS. 7A and 7B show examples of a frame of image data generated with different settings in accordance with embodiments of the present disclosure.

FIG. 8 shows exemplary derivatives of a frame of image data produced by permutations of pre-processing circuits in accordance with the present disclosure.

FIG. 14C depicts an exemplary database for recording pre-paid licenses that may have been purchased by an individual, organization, company or other group of users.

DETAILED DESCRIPTION

Figure 1:
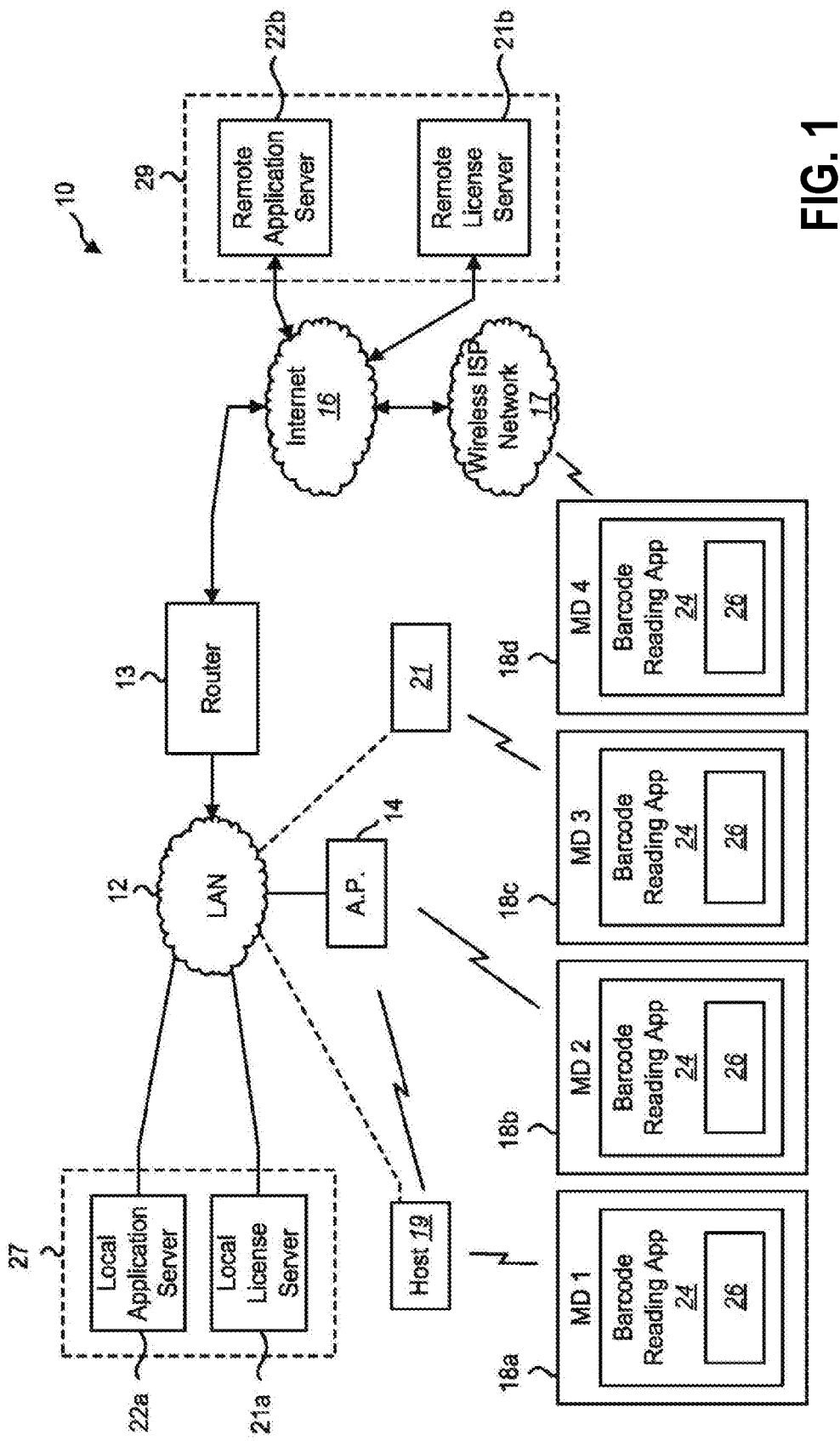
FIG. 1 illustrates a system in which aspects of the present disclosure may be utilized.

FIG. 1 depicts a system 10 according to one embodiment of the present application wherein mobile devices 18a-18d obtain: i) at least one barcode-reading application 24 from an application server 22a or 22b; and ii) obtain licensing (e.g., a license key 26) necessary for the operation of the at least one barcode-reading application 24 on the mobile devices 18a-18d from a licensing server 21a or 21b.

As used in this patent specification and the accompanying claims, the term "mobile device" will be used to describe a portable, hand-held computing device that comprises a camera. As indicated above, one example of a mobile device is a smartphone. Another example of a mobile device is a tablet computer. Yet another example is a hybrid tablet/smartphone device, often nicknamed a "phablet."

The application server may be, for example, a local application server 22a or a remote application server 22b. Similarly, the license server may be a local license server 21a or a remote license server 21b. The application server and the license server may operate on distinct hardware or may operate on the same hardware server. For example, the local application server 22a and the local license server 21a may operate on the same hardware server 27 or on distinct hardware servers, each coupled to a local area network (LAN) 12. Similarly, the remote application server 22b and the remote license server 21b may operate on the same hardware server 29 or on distinct hardware servers, each coupled to the Internet 16.

The system 10 may include a LAN 12 to which each of the local application server 22a and the local license server 21a are connected. The LAN 12 may further include at least one wireless access point 14 enabling LAN communications with mobile devices (for example, mobile devices 18b and 18c) as well as other computing systems such as a host computer 19 and/or a charging station 21 (e.g., a station for providing power to the mobile device 18 for charging its battery).

The LAN 12 may be coupled to the Internet 16 via a router 13. Although FIG. 1 depicts the LAN 12 coupled to the Internet 16 via a single router 13, such connections may employ multiple routers and firewall systems, including demilitarized zone (DMZ) networks.

Figure 2:
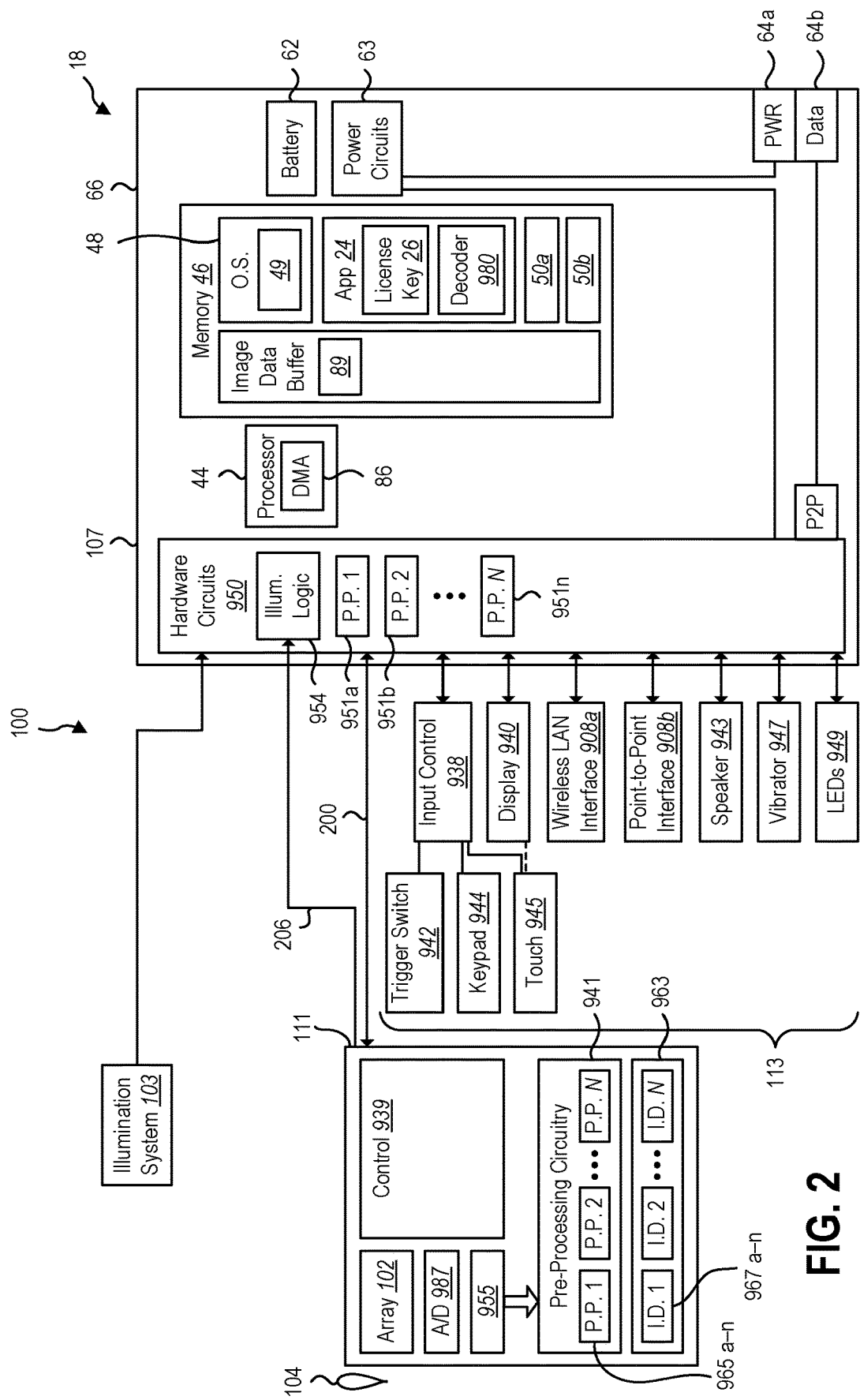
FIG. 2 illustrates an example of a barcode reading system in accordance with the present disclosure.

Referring to FIG. 2 in conjunction with FIG. 1, each of the mobile devices 18a-18d may include a barcode reading system 100 as shown in FIG. 2. In accordance with one embodiment, the barcode reading system 100 may include an image decoding system 107 in combination with an image sensor system package 111, an illumination system 103, and various input/output (I/O) peripheral systems 113.

The image sensor system package 111 and the image decoding system 107 may be included in two separate packages, each of which may include one or more silicon dies that may include: i) a processor; ii) hardware circuits including digital signal processing and/or gate logic, and iii) memory.

The image sensor system package 111 may be coupled to the image decoding system 107 via a communication interface 200. For simplicity, the communication interface 200 may sometimes be referred to herein simply as an interface 200.

I/O Peripheral Systems

The I/O peripheral systems 113 may include a user interface comprising input control 938 and/or a display 940. The input control 938 may include a trigger switch 942, a keypad 944, and/or a touch panel 945, such as a touch screen over the display 940. In addition, the barcode reading system 100 may have one or more output devices that convey information to a user. Such output devices may include the touch panel 945, which may be a touch screen, a speaker 943, a vibrator 947, and/or one or more components that illuminate in a manner visible to a user, such as one or more LEDs 949.

The I/O peripheral systems 113 may further include one or more communication interfaces. The communication interfaces may include a wireless LAN interface 908a and a point-to-point interface 908b which may be a wireless point-to-point interface and/or a hardwired point-to-point interface.

The wireless LAN interface 908a may permit the barcode reading system 100 to be an addressable endpoint in a wireless local area network and communicate with a host device through the LAN using, for example, Transmission Control Protocol/Internet Protocol (TCP/IP) or the like.

The wireless point-to-point interface(s) 908b may be, for example, a Bluetooth® interface to enable the barcode reading system 100 to establish a wireless point-to-point communication link with, and communicate over the wireless communication link with, a host device (i.e., a host computer).

The hardwired point-to-point interface(s) 908b may comprise a Universal Asynchronous Receiver/Transmitter (UART) or a Universal Serial Bus (USB) in each case to enable the barcode reading system 100 to establish a point-to-point connection with a host device using a multi-conductor data interface.

Image Decoding System

The image decoding system 107 may include: i) a processor 44; ii) a memory 46; and iii) hardware circuits 950 for coupling to, and driving operation of, each of the illumination system 103, the I/O peripheral systems 113, and the image sensor system package 111.

The processor 44 may be embodied as a combination of one or more microprocessors, microcontrollers, digital signal processors (DSP), or the like, and, when operating, may execute instructions (in the form of an operating system and/or applications) stored in the memory 46. The memory 46 may be any component capable of storing electronic information, including an operating system and/or application instructions executable by the processor 44, and may be embodied as read-only memory (ROM), random access memory (RAM), magnetic disk storage media, optical storage media, flash memory devices, on-board memory included with the processor 44, erasable programmable read-only memory (EPROM), electrically erasable programmable read-only memory (EEPROM), and/or registers, etc.

The memory 46 may include an operating system 48, the barcode-reading application 24, one or more other applications 50a, 50b, and a data buffer including an image data buffer 89. The barcode-reading application 24 may include a license key 26 and a decoder 980. The decoder 980 may be configured to process image frames and attempt to decode barcodes contained therein. The license key 26 may be required in order to use the decoder 980 (or, alternatively, in order to use all of the functionality of the decoder 980). In operation, the processor 44 may execute instructions embodied in the operating system 48, the barcode-reading application 24, and each of the other applications 50a, 50b.

The hardware circuits 950 provide the interface between the image decoding system 107 and each of the illumination system 103, the I/O peripheral systems 113, and the image sensor system package 111. The hardware circuits 950 may further include illumination logic 954 and pre-processing circuits 951a-n.

Image Sensor System Package

The image sensor system package 111 may include: i) a two-dimensional photo sensor array 102 onto which illumination from the field of view of the barcode reading system 100 (FIG. 2) is focused by the optic system 104; ii) pre-processing circuitry 941 comprising one or more pre-processing circuits 965a-n; iii) volatile memory or storage such as random access memory implementing an image buffer 963; iv) hardware gate logic implementing wide bus logic 955 for transferring each image frame captured by the photo sensor array 102 to the pre-processing circuitry 941 (or the image buffer 963); and v) control circuitry 939 which may include a combination of gate logic, volatile memory or storage, a processor executing code stored in the memory implementing control of the photo sensor array 102 (image read-out), the wide bus logic 955, the pre-processing circuitry 941; the image buffer 963, and transfer of image data records to the image decoding system 107.

Photo Sensor Array

The photo sensor array 102 may comprise a two-dimensional rolling shutter array of pixels with each pixel comprising an active photosensitive region capable of measuring or quantifying the intensity of illumination incident on the pixel fabricated, for example, using known complementary metal oxide semiconductor (CMOS) sensor technology. Each pixel may be a photodiode which accumulates charge over the duration of an exposure period. Prior to commencement of the exposure period the photodiode may be coupled to ground to dissipate an accumulated charge and the exposure period for the pixel may commence when the photodiode is de-coupled from ground so that a charge accumulates in proportion to the intensity of illumination incident on the pixel. The charge on the photodiode continues to accumulate so long as illumination is incident on the photodiode. The exposure period ends when the accumulated charge is measured by an analog to digital (A/D) converter.

In one embodiment, the photodiode may couple to the input of an A/D converter when the control circuitry 939 generates a read signal and, upon coupled of the photodiode to the A/D converter, the A/D converter generates a digital value representative of the accumulated charge at the time the photodiode is coupled to the A/D converter which is input to a register of the wide bus logic 955 for transfer to the pre-processing circuits 965a-n (or the image buffer 963).

In another embodiment, the photodiode may be coupled to the input of an A/D converter prior to the end of the exposure period. In this embodiment, the A/D converter may be continually making a digital value representative of the accumulating charge available at its output port with that digital value continually increasing as charge accumulates on the photodiode (i.e. periodically updating the digital value to represent the increasing voltage as charge accumulates on the photodiode). In this embodiment when the control circuitry 939 generates a read signal the then current digital value (at the time of the read signal) is read or input to a register of the wide bus logic 955 for transfer to the pre-processing circuits 965a-n (or the image buffer 963).

In order to improve sensitivity of the photo sensor array 102, the pixels do not include a masked charge storage region associated with each photosensitive region for temporarily holding accumulated charge from the photodiode region prior to coupling the charge from the photodiode to the A/D converter 987. Directly coupling the photosensitive region to the A/D converter 987 means that there is no charge storage region separate from the photodiode on which charge is accumulating. Stated another way, in neither of the foregoing embodiments, is the accumulated charge on the photodiode buffered, as an analog charge or otherwise, prior to being coupled to the A/D converter. Stated in yet another way, in neither of the foregoing embodiments is accumulation of the charge stopped, or the accumulated charge otherwise made static (no more accumulation) prior to being coupled to the A/D converter.

Figure 3A:
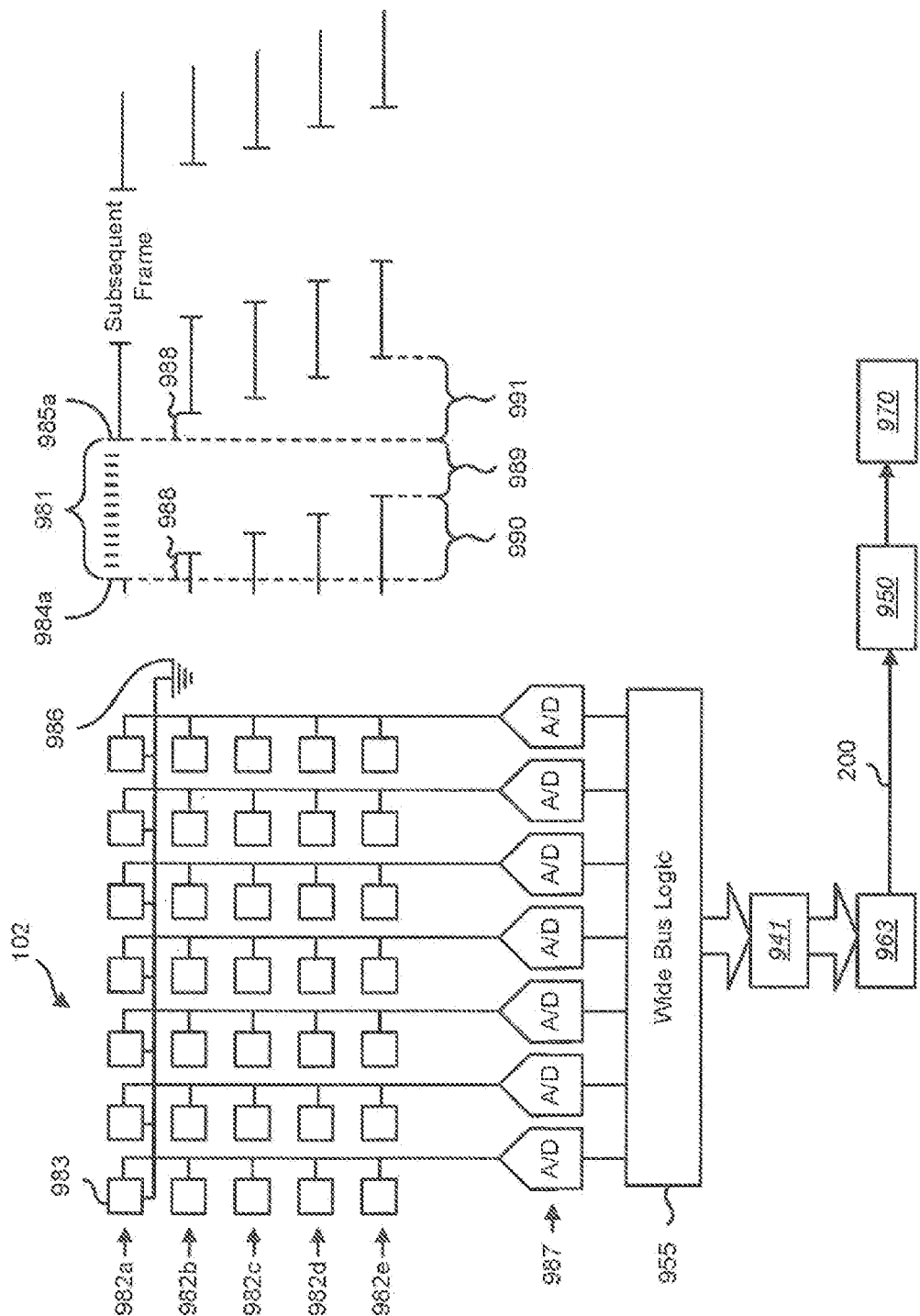
FIG. 3A shows image read-out circuitry and an operation of an image reading out in accordance with one embodiment of the present disclosure.

FIG. 3A depicts a photo sensor array 102 with A/D converters 987 and an image capture operation in accordance with one embodiment of the present disclosure. The photo sensor array 102 may comprise a plurality of rows of pixels 982a-e and one A/D converter 987 per column of pixels such that each pixel in an entire row may have a simultaneous exposure period end time and may be simultaneously coupled to a corresponding analog-to-digital (A/D) converter 987 which generates the digital value at the end of the exposure period applicable to the pixel.

In the exemplary embodiment wherein there is one A/D converter per column, the photo sensor array 102 may be operative such that exposure of the rows of pixels 982a-e is initiated, and subsequently terminated, sequentially from the first of the plurality of rows (e.g., row 982a) to the last of the plurality of rows (e.g., row 982e), one row at a time from either the top of the photo sensor array 102 to the bottom of the photo sensor array 102 or from a top row within a cropped window of the photo sensor array 102 to the bottom row within the cropped window of the photo sensor array 102.

More specifically, using row 982a at a top of the photo sensor array 102 as an example, the exposure period begins at a start of an exposure period 984a and the end of the exposure period 985a. The start of the exposure period 984a begins when the photosensitive region 983 of each pixel within the row is contacted with the ground 986 to dissipate any charge which may have accumulated on the photosensitive region 983 prior to the beginning of the exposure period. The end of the exposure period 985a is when the photosensitive region 983 of each pixel in the row is coupled directly to an A/D converter 987 and the A/D converter 987 generates a digital intensity value (digital value) representative of the accumulated charge. The digital intensity value for each pixel within the row may be written to a register of the wide bus logic 955 for output to the pre-processing circuits 965a-n or directly to the image buffer 963.

It should be appreciated that one row of pixels at a time may be simultaneously exposed (simultaneous commencement and subsequent simultaneous termination of an exposure period). The next row of pixels may then have a simultaneous exposure period that does not require termination (e.g. coupling of each pixel to an A/D converter) until after the A/D converters have completed operation on the previous row. The time required for an A/D converter to produce a digital value representative of accumulated charge may be referred to as the A/D converter cycle time. When the quantity of A/D converters is equal to the number of columns the minimum read-out time for all rows would be the number of rows multiplied by the A/D converter cycle time.

In more detail, the start of exposure for each row is initiated at a predetermined amount of time 988 following the start of exposure for the immediately preceding row and the end of exposure for each row occurs at the predetermined amount of time 988 following the end of exposure for the immediately preceding row. The predetermined amount of time 988 may be greater than the time required for each pixel in the row to be coupled to its A/D converter 987, the intensity value to be written to the register of the wide bus logic 955, and the register value to be output to the pre-processing circuits 965a-n or written to the image buffer 963. In the exemplary embodiment, each row of pixels an exposure period long enough, and read-out fast enough, such that the exposure period is initiated for the last row of pixels 982e of the photo sensor array 102 prior to the end of the exposure period (i.e., when read-out commences) for the first row of pixels 982a of the photo sensor array 102 such that a time period 989 exists when all rows are being simultaneously exposed.

As such, the total exposure period for the array of pixels comprises: i) a first period 990 being the time between when exposure of the first row of the array is initiated and exposure of the last row of the array is initiated; ii) a second period 989 being the time when all rows are being simultaneously exposed; and iii) a third period 991 being the time between when read-out of the first row of the array is initiated and read-out of the last row is initiated (i.e., the time between when exposure of the first row ends and exposure of the last row of the array ends). In one embodiment, the total exposure period for any particular row remains less than 20 ms. In another embodiment, the total period from start of exposure for the first row and end of exposure for the last row may be less than 20 ms.

In one embodiment, the exposure period 981 may be expressed as a quantity of rows of the image sensor array. The total exposure time may be expressed as the number of rows multiplied by the time 988 required to read-out a row. Stated another way, when the exposure period 981 is expressed as a quantity of rows, the numerical value for the exposure period is the quantity of rows between the row that is then currently commencing its exposure period and the row that is then currently being read-out (ending exposure period). When the exposure period is very short (i.e., a quantity of rows less than the total quantity of rows in the array) read-out of the rows that first started exposure (for example at the top of the array if exposure runs from the top to the bottom) commences before rows at the bottom of the array begin exposure. However, as described above, in the exemplary embodiment, read-out is very fast such that the exposure period, when expressed as a quantity of rows, will be a numerical value greater than the total number of rows in the photo sensor array 102.

While FIG. 3A depicts one A/D converter 987 per column, it should be appreciated that other configurations may include fewer A/D converters 987 (fewer than one (A/D converter 987 per column) or more than one A/D converter 987 per column. The quantity of A/D converters may define the quantity of pixels for which the exposure period may simultaneously end (e.g. the quantity of pixels for which the accumulated charge may be simultaneously converted to a corresponding digital value).

As another example, if the quantity of A/D converters is equal to half the number of columns, one-half of a row of pixels may be simultaneously exposed. The next one-half row of pixels may then have a simultaneous exposure period that does not require termination until after the A/D converters have completed operation on the previous one-half row. If the quantity of A/D converters is equal to one-half the number of columns it would require two A/D converter read-out cycles to read-out each row and the minimum read-out time for all rows would be the number of rows multiplied by two and then multiplied by the A/D converter cycle time.

Figure 3B:
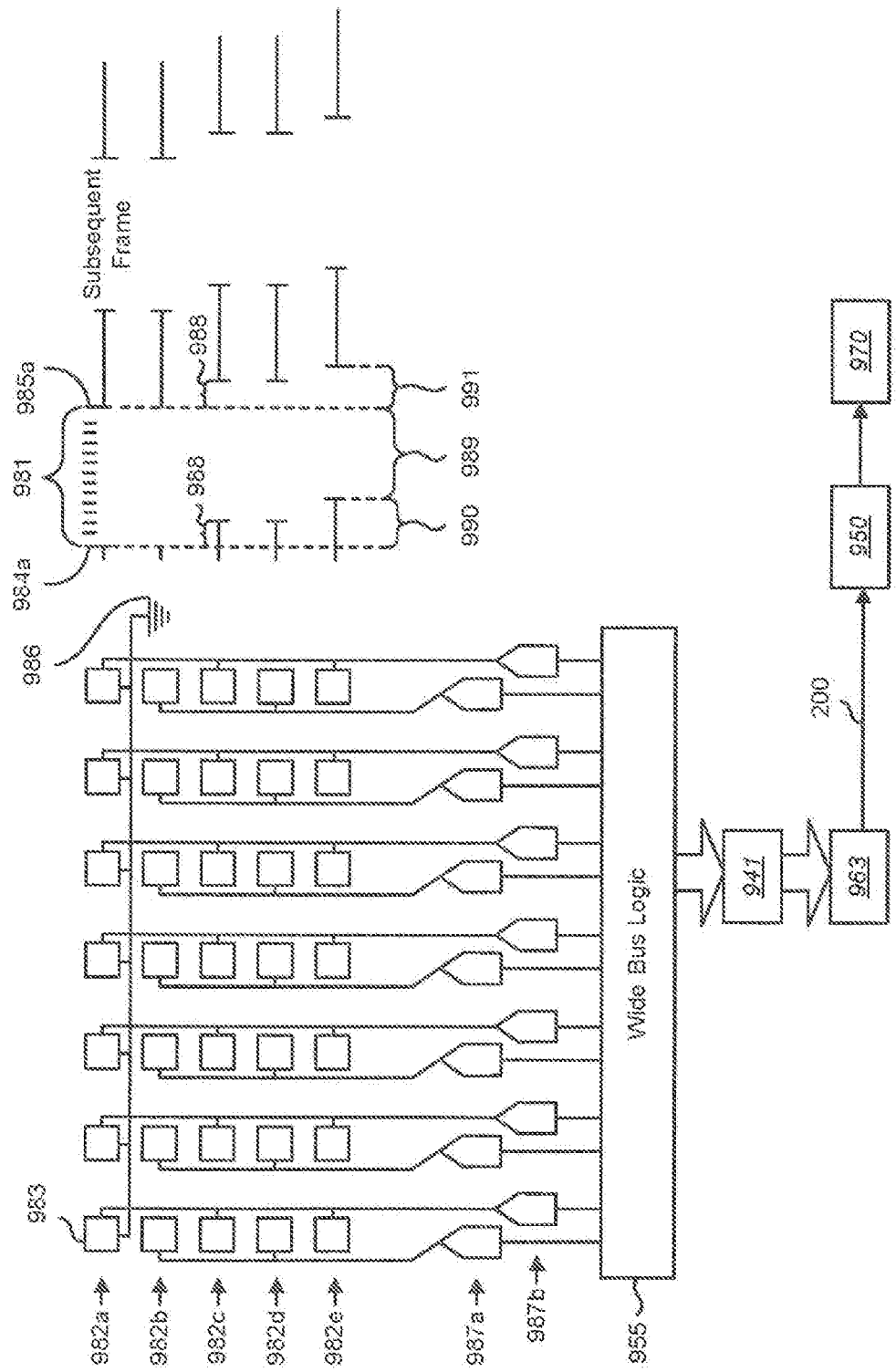
FIG. 3B shows image read-out circuitry and an operation of an image reading out in accordance with another embodiment of the present disclosure.

Similarly, as depicted in FIG. 3B, the quantity of A/D converters 987a and 987b may be equal to twice the number of columns (arranged in two banks of A/D converters 987a and 987b). In this exemplary embodiment, there are a sufficient quantity of A/D converters to read-out two rows simultaneously. Each bank of A/D converters 987a and 987b is connected to, and operates on, every other alternating row of pixels. As such, the photo sensor array 102 may be operative such that exposure of the rows of pixels 982a-e is initiated, and subsequently terminated, sequentially in two-row groups from the first group of rows (e.g., row 982a-b) to the last of the plurality of rows (e.g., group including rows 982d-e).

More specifically, using rows 982a and 982b at as top of the photo sensor array 102 as an example, the exposure period begins at a start of an exposure period 984a and the end of the exposure period 985a. The start of the exposure period 984a begins when the photosensitive region 983 of each pixel within the two rows is contacted with the ground 986 to dissipate any charge which may have accumulated on the photosensitive region 983 prior to the beginning of the exposure period. The end of the exposure period 985a is when the photosensitive region 983 of each pixel in the two rows is coupled directly to an A/D converter 987a, 987b and the A/D converter 987 to generate a digital intensity value (digital value) representative of the accumulated charge. The digital intensity value for each pixel within the two rows may be written to a register of the wide bus logic 955 for output to the pre-processing circuits 965a-n or directly to the image buffer 963.

It should be appreciated that in this embodiment two rows of pixels at a time may be simultaneously exposed (simultaneous commencement and subsequent simultaneous termination of an exposure period). The next group of two rows of pixels may then have a simultaneous exposure period that does not require termination (e.g. coupling of each pixel to an A/D converter) until after the A/D converters have completed operation on the previous group of two rows. Again, the time required for an A/D converter to produce a digital value representative of accumulated charge may be referred to as the A/D converter cycle time. When the quantity of A/D converters is equal to twice the number of columns the minimum read-out time for all rows would be one half the number of rows multiplied by the A/D converter cycle time.

In more detail, the start of exposure for each group of two rows is initiated at a predetermined amount of time 988 following the start of exposure for the immediately preceding group of two rows and the end of exposure for each group of two rows occurs at the predetermined amount of time 988 following the end of exposure for the immediately preceding group of two rows.

The predetermined amount of time 988 may be greater than the time required for each pixel in the group of two rows to be coupled to its A/D converter 987, the intensity value to be written to the register of the wide bus logic 955, and the register value to be output to the pre-processing circuits 965a-n or written to the image buffer 963. In the exemplary embodiment, each pixel within the group of two rows is subject to an exposure period long enough, and read-out fast enough, such that the exposure period is initiated for the last group of two rows of pixels 982d-e of the photo sensor array 102 prior to the end of the exposure period (i.e., when read-out commences) for the first group of two rows of pixels 982a-b of the photo sensor array 102 such that a time period 989 exists when all rows are being simultaneously exposed.

As such, the total exposure period for the array of pixels comprises: i) a first period 990 being the time between when exposure of the first group of two rows of the array is initiated and exposure of the last group of two rows of the array is initiated; ii) a second period 989 being the time when all rows are being simultaneously exposed; and iii) a third period 991 being the time between when read-out of the first group of two rows of the array is initiated and read-out of the last group of two rows is initiated (i.e., the time between when exposure of the first group of two rows ends and exposure of the last group of two rows of the array ends).

In one embodiment, the total exposure period for any particular group of two rows remains less than 20 ms. Alternatively, the total period from start of exposure for the first group of two rows and end of exposure for the last group of two rows may be less than 20 ms.

Windowing, Binning, Sub Sampling (Read-Out Level)

The term image frame, as used herein, may be a full image frame, a binned image frame, a sub-sampled image frame, or a window of any of a full, binned, or sub-sampled image frame.

As used herein, the term "full image frame" refers to an image frame that is captured when an entire photo sensor array 102 is exposed and read-out. Thus, a full image frame may include pixels corresponding to all of the photo sensors in the photo sensor array 102.

Figure 6A:
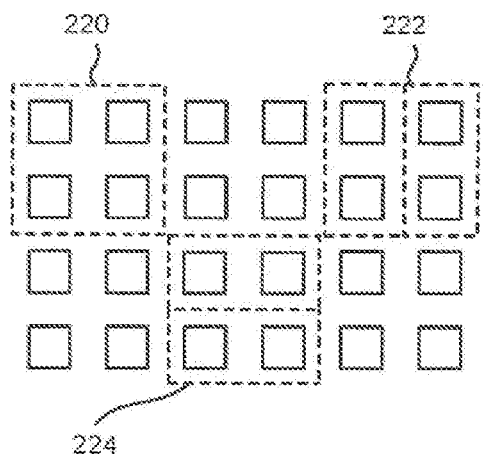
FIGS. 6A-6D show examples of pre-processing in accordance with some embodiments of the present disclosure.

As used herein, the term "binned image frame" refers to an image frame that is captured by simultaneously combining the photodiodes for multiple adjacent pixels to a single A/C converter (effectively creating a single pixel with a larger photosensitive region comprising the photosensitive regions of the combined pixels, but an overall lower resolution for the image frame). Common binning may include combining groups of two adjacent pixels horizontally, groups of two adjacent pixels vertically, and two-by-two groups of pixels as depicted in FIG. 6A. The resolution values of the image capture parameter values for an image frame that is to be captured as a binned image frame will define the binning (how adjacent pixels are to be grouped).

As used herein the term "sub-sampled image frame" refers to an image frame that is captured at a lower resolution utilizing a pattern of fewer than all of the pixels applied across the full photo sensor, for example every second pixel or every fourth pixel. The used pixels are read-out while the un-used pixels are not-read-out or the data is ignored. The resolution values of the image capture parameter values for an image frame that is to be captured as a sub-sampled image frame will define the sub-sampling ratio of pixels which are read and used versus un-used pixels.

As used herein the term "a window of an image frame" refers to a portion of a full image frame, a binned image frame or a sub-sampled image frame that is smaller than the full photo sensor array image, either by vertical cropping, horizontal cropping, or both. The portions of the pixels outside of the cropping may not be read-out. The image capture parameter values for an image frame that is to be captured as a windowed image frame (full, binned, or sub-sampled) will define the horizontal and vertical cropping, as applicable.

It should be appreciated that binning, subsampling, and windowing may be performed by the photo sensor array 102 at read-out such that the resulting image frame (full, binned, sub-sampled, and/or windowed) is the image frame input to the pre-processing circuits 965a-n.

Wide Bus Logic

To enable digital values representative of illumination on pixels to be transferred very quickly from the A/D converters 987 to the pre-processing circuits 965a-n (or written directly to the image buffer 963) wide bus logic 955 may transfer the digital intensity values from all A/D converters 987 to the pre-processing circuits 965a-n (or the image buffer 963) in parallel (e.g. the same clocking cycles transfer all digital intensity values from all A/D converters 987 to the pre-processing circuits 965a-n (or the image buffer 963) simultaneously).

Stated another way, the wide bus logic 955 may include transfer logic modules, each implementing a channel for transfer of a digital intensity value from an A/D converter 987 to the pre-processing circuits 965a-n (or the image buffer 963), with the quantity of transfer logic modules being equal to the quantity of A/D converters, and with each distinct transfer logic module being coupled to the output of one distinct A/D converter. Stated yet another way, the wide bus logic 955 may implement a digital intensity value transfer bus (from the A/D converters 987 to the pre-processing circuits 965a-n (or the image buffer 963) that is as wide as the number of A/D converters.

Alternatively, the width of the wide bus logic 955 may be 50% of the number of A/D converters, in which case it would take two bus cycles to transfer all digital intensity values from all A/D converters to the pre-processing circuits 965a-n or to the image buffer 963. Alternatively, the width of the wide bus logic 955 may be 25% of the number of columns, in which case it would take four bus cycles to transfer all digital intensity values from all A/D converters to the pre-processing circuits 965a-n or to the image buffer 963. It should be noted that the width of the wide bus logic 955 may be any percentage of the number of columns of the photo sensor array. However, if an entire row of pixels is to undergo a simultaneous exposure period utilizing a quantity of A/D converters equal to the number of pixels in the row, but the bus logic 955 is not sufficient to transfer digital intensity values from all A/D converters simultaneously, the bus logic 955 may include first-in-first-out (FIFO) buffers (one FIFO buffer for each A/D converter) for buffering digital intensity values prior to transfer to the pre-processing circuits 965a-n or to the image buffer 963.

Pre-Processing Circuits

Returning to FIG. 2, the pre-processing circuitry 941 includes multiple pre-processing circuits 965a-n. The pre-processing circuits 965a-n may perform operations such as convolution, binning, sub-sampling, cropping and other image processing functions on an image frame (full, binned, sub-sampled, and/or cropped) to generate one or more image data record 967a-n, each of which is derived from the image frame or an image data record that was previously derived from the image frame.

Each pre-processing circuit 965a-n may receive as input either: i) a an image frame (full, binned, sub-sampled, and/or cropped) received directly from the photo sensor array 102 by way of the wide bus logic 955; or ii) an image data record 967a-n from the image buffer 963 which is the result of a different pre-processing circuit 965a-n previously operating on an image frame (full, binned, sub-sampled, and/or cropped) received directly from the photo sensor array 102 by way of the wide bus logic 955.

It should be noted that one image frame (full, binned, sub-sampled, and/or cropped) may be input to multiple pre-processing circuits 965a-n resulting in multiple image data records 967a-n being written to the image buffer 963 for the same frame of image data. Further, for a burst of multiple image frames (described herein), each image frame (full, binned, sub-sampled, and/or cropped) may be input to the same one or more pre-processing circuits 965a-n or permutations of different image frames of the burst may be input to different subsets of pre-processing circuits 965a-n, each subset including one or more pre-processing circuits 965a-n.

It should also be noted that one of the pre-processing circuits 965 may simply write the image frame (full, binned, sub-sampled, and/or cropped) to the image buffer 963 as an image data record 967a-n without performing substantive image processing (e.g. writing the intensity values received from the A/D converters for the image frame to the image buffer).

Referring briefly to FIG. 8, image processing functions that may be performed by any of the image pre-processing circuits 965a-n and the image data records 967a-n derived from each image frame (whether full, binned, sub-sampled, and/or windowed and/or cropped) include: i) transfer of the image frame or a window within an image frame (full, binned, cropped, or sub-sampled) as a resulting image data record 967a-n to the image buffer 963; ii) cropping of an image frame (full, binned, cropped, or sub-sampled) and transfer of the resulting image data record 967a-n to the image buffer 963; iii) binning an image frame (full, binned, cropped, or sub-sampled) and transfer of the resulting image data record 967a-n to the image buffer 963; iv) subsampling an image frame (full, binned, cropped, or sub-sampled) and transfer of the resulting image data record 967a-n to the image buffer 963; v) generating a rotation of an image frame (full, binned, cropped, or sub-sampled) and transfer of the resulting image data record 967a-n to the image buffer 963; vi) generating a convolution of an image frame (full, binned, cropped, or sub-sampled) and transfer of the resulting image data record 967a-n to the image buffer 963; and vii) generating a double convolution which is a second sequential convolution performed on the result of a previously performed convolution of a an image frame (full, binned, cropped, or sub-sampled) and transfer of the resulting image data record 967a-n to the image buffer 963. Each sequential convolution utilizes a different distinct kernel. Each of these image processing operations is described in more detail herein.

The pre-processing circuits 965a-n may be implemented in hardware gate logic to provide for image processing very quickly such that processing by a pre-processing circuit 965a-n, and thereby generating, and storing in the image buffer 963, one or more image data records 967a-n may be performed during the limited amount of time that the image frame is being read from the photo sensor array 102 such that raw pixel data (i.e., digital intensity values from the A/D converters coupled to the image sensor array) do not need to be stored in memory (other than simple FIFO buffers) prior to being processed by the pre-processing circuits 965a-n.

Control Circuitry

The control circuitry 939 may be any combination of hardware gate logic and/or a processor executing a code stored in a volatile or non-volatile memory. The control circuitry 939 interfaces with the image decoding system 107, the pre-processing circuits 965a-n, and the photo sensor array 102.

In operation the control circuitry may receive, from the image decoding system 107 via interface 200, image capture parameter values for a burst of one or more image frames (full, binned, sub-sampled, and/or cropped) to be sequentially captured. As will be described in more detail herein, the image capture parameter values define, for the burst of one or more image frames to be captured by the photo sensor, a quantity of image frames to be sequentially captured (the burst of images) and, for each image within the burst: i) whether a full image frame, binned image frame, sub-sampled image frame, or a window of a full, binned, or sub-sampled image frame is to be captured; ii) the binning or subsampling resolution (vertically and horizontally) and/or window cropping, if applicable; iii) an exposure setting; iv) a gain setting; and v) an indication of a permutation of one or more pre-processing functions to apply to the image frame (full, binned, sub-sampled and/or windowed), including pre-processing functions that are to be applied to an image data record resulting from a previous pre-processing function being applied to the image frame (full, binned, sub-sampled, and/or windowed).

In further operation, after receiving the image capture parameter values, the control circuitry 939 may, for each image frame to be captured, set image capture settings to the image capture parameter values for the image frame and, in response to a trigger signal from the image decoding system 107, drive the photo sensor array 102 to sequentially capture each of one or more image frames of the burst in accordance with the image capture settings and without further trigger signal(s) from the image decoding system 107.

In more detail, the control circuitry 939 adjusts the image capture settings between the exposure periods for each sequentially captured image frame such that each captured image frame within the burst of image frames is captured with image capture settings specifically defined for that image frame by the image decoding system 107. At least one of the multiple frames of image data may be captured with a distinct value of at least one image capture parameter.

Each captured image frame (full, binned, sub-sampled, and/or windowed) may, under control of the control circuitry 939 be input to selected one or more pre-processing circuits 965a-n in accordance with the image capture parameter values for purposes of performing the pre-processing functions previously described. Resulting image data records 967a-n are written to the image buffer 963.

Further, the control circuitry 939 may, for selected image data records 967a-n in the buffer memory 963, drive selected other pre-processing circuits 965a-n to receive the selected image data record 967a-n and generate, and write to the image buffer 963, an image data record 967a-n which is derived therefrom.

Further yet, the control circuitry 939 may, as requested by the image decoding system 107, provide certain image data records 967a-n (or portions of certain image data records 967a-n) to the image decoding system 107 for further processing and decode.

Image Capture

Circuitry within the image sensor system package 111 and/or the image decoding system 107 may control image capture by: i) defining (or receiving from the decoder 980) image capture parameter values for a burst of one or more image frames to be sequentially captured by the photo sensor array 102 of the image sensor system package 111 and the image processing to be performed on each image frame; ii) initiating the capture of the sequence of one or more image frames by the photo sensor array 102 and the corresponding performance of the image processing thereon by the pre-processing circuits 965a-n to generate image data records 967a-n, each of which is a derivative of an image frame within the sequence of one or more image frames; and iii) controlling the illumination system 103 to illuminate the barcode within the field of view during capture of each frame of the sequence of one or more image frames.

As described, the image capture parameter values may define a quantity of image frames to be sequentially captured (the burst of images) and, for each image within the burst: i) whether a full image frame, binned image frame, sub-sampled image frame, or a window of a full, binned, or subsampled image frame is to be captured; ii) the binning or subsampling resolution (vertically and horizontally) and/or the windowing cropping for the image frame to be captured if applicable; iii) an exposure setting; iv) a gain setting, v) an indication of a permutation of one or more previously described pre-processing functions to apply to the image frame (full, binned, sub-sampled, and/or cropped) by the image pre-processing circuits 965a-n within hardware circuits of the image sensor system package 111, including pre-processing functions that are to be applied to an image data records 967a-n resulting from a previous pre-processing function being applied to the image frame (full, binned, sub-sampled and/or cropped).

The exposure period may be the duration of time each pixel is exposed (i.e., the duration of time between the beginning of the exposure period and the end of the exposure period).

The gain setting may be a gain value implemented for ensuring that the pixel intensity values (or binned pixel intensity values) utilize the dynamic range of the A/D converters.

Initiating the capture of the sequence of one or more image frames of a barcode within a field of view of the photo sensor array 102 may include providing a single trigger signal to the control circuitry 939 of the image sensor system package 111 to initiate the capture of the sequence of one or more image frames. Such single trigger signal may be provided after the image capture parameter values defining the sequence of image frames to be captured and pre-processing to be performed by pre-processing circuits 965*a-n* within the image sensor system package 111 have been provided to the control circuitry 939 such that the control circuitry 939 may autonomously capture the sequence of image frames and drive the pre-processing circuits 965*a-n* to perform the applicable pre-processing in accordance with the image capture parameter values without further control having to be provided by the image decoding system 107.

Controlling the illumination system 103 to illuminate the barcode within the field of view during capture of each frame of the sequence of one or more image frames may comprise controlling illumination logic 954 within hardware circuits 950.

In more detail, the illumination system 103 is coupled to the hardware circuits 950 which provide power required for the light emitting diodes (LEDs) or other illumination sources to generate illumination under control of illumination logic 954. More specifically, for each image frame to be captured by the photo sensor array 102, illumination parameters may be provided to the illumination logic 954 which control the illumination settings to be used for capture of the image frame. More specifically, the illumination parameters may define such illumination settings as the intensity of illumination to be generated by the illumination system 103. In certain exemplary embodiments the intensity may be defined as: i) a percentage from zero percent (0%) to one hundred percent (100%) representing the percent of a maximum illumination intensity that can be generated by the LEDs (or other illumination sources) of the illumination system 103; ii) pulse-width-modulation (PWM) parameters representing the percentage of time during the exposure period that maximum operating power is applied to the LEDs (or other illumination sources) of the illumination system 103 in a pulsing pattern; and iii) a percentage greater than one hundred percent (100%) representing a power level to be applied if the LEDs of the illumination system 103 if the LEDs are to be over-driven.

In certain embodiments, the illumination parameters may be provided to the illumination logic 954 for one or more image frames within a burst of image frames to be captured by the photo sensor array 102. The illumination parameters for each frame may be written to a distinct register within the illumination logic 954.

During capture of each image frame of one or more image frames within a burst of image frames, the illumination logic 954 sets the illumination settings for the image frame to conform to the illumination parameters for the image frame by configuring power circuits of the hardware circuits 950 to apply the applicable power to the illumination system 103.

In one embodiment, the illumination logic is coupled to a flash signal generated by the control circuitry 939 of the image sensor system package 111 and output on a flash signal line 206. The flash signal is configured to generate a signal indicating a start of each exposure period and an end of each exposure period, for each image frame captured by the photo sensor array 102 within a burst of one or more image frames. In this embodiment the illumination logic may, for each image frame: i) set the illumination settings for the image frame to conform to the illumination parameters for the image frame by configuring power circuits of the hardware circuits 950 to apply the applicable power to the illumination system 103; ii) apply the applicable power to the illumination system 103 when the flash signal on the flash signal line 206 indicates start of the exposure period for the image frame; ii) deactivate the power to the illumination system 103 when the flash signal on the flash signal line 206 indicates the end of the exposure period; and iv) repeat steps i-iii for the next image frame within the sequence utilizing the illumination parameters for that next image frame within the sequence. The illumination parameters may be considered image capture parameter values in addition to those image capture parameter values previously described.

Decoder

The decoder 980, when executed by the processor 44, may determine which of the one or more image data records 967*a-n* (or windows within one or more image data records 967*a-n*) may be transferred from the image buffer 963 to the image decoding system 107. In addition, the decoder 980 may decode the barcode present within the field of view of the barcode reading system 100 and imaged within the one or more image frames (whether full, binned, or sub-sampled) captured by the photo sensor array 102 and represented by at least a portion of one of the image data records 967*a-n* derived from such image frame(s).

Figure 5:
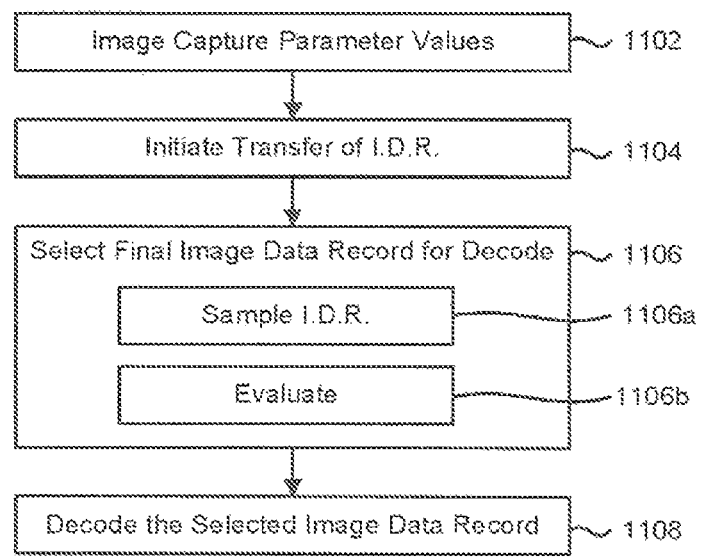
FIG. 5 illustrates an example of a method for decoding an image data record in accordance with one embodiment of the present disclosure.

Referring to FIG. 5, exemplary operation of the decoder 980 is depicted in accordance with one embodiment. Step 1102 represents the decoder 980 determining the image capture parameter values for a burst of one or more image frames as previously described.

Step 1104 represents transferring one or more image data records 967*a-n* (or portions of one or more image data records 967*a-n*) from the image buffer 963 to the image decoding system 107 and establishing which, if any, pre-processing functions are to be performed by image pre-processing circuits 951*a-n*.

Step 1106 represents selecting an image data record 967*a-n* for decoding, which may include sampling final image data records 967*a-n* at step 1106*a* and evaluating the sampled image data records 967*a-n* at step 1106*b*.

Step 1108 represents decoding the selected image data record. This operation may include, based on the resulting image data records 967*a-n* meeting or failing to meet certain criteria: i) driving image pre-processing circuits 951*a-n* to perform additional image processing operations, as previously described on one or more of the image data records 967*a-n* (or on a window of, a binning of, or a sub-sampling of each of one or more image data records 967*a-n*) and write resulting additional, or replacement, image data records 967*a-n* to the buffer memory; ii) driving the transfer of one or more additional image data records 967*a-n* (full, windowed, binned, or sub-sampled) to the image decoding system 107 (without obtaining an additional burst of one or more image frames) and, optionally driving performance of additional pre-processing operations on the additional image data records 967*a-n* by the pre-processing circuits 951*a-n*; and/or iii) driving capture of one or more additional bursts of image frames (whether full, windowed, binned or subsampled), resulting in one or more additional image data records 967a-n being written to the image buffer 963, and then driving transfer of one or more of the additional image data records 967a-n (full, windowed, binned or subsampled), but not necessarily all of the additional image data records 967a-n in the image buffer 963, to the image decoding system 107 and, optionally driving performance of additional pre-processing operations on the additional image data records 967a-n by the pre-processing circuits 951a-n. This aspect of the operation may be repeated until at least one of the image data records 967a-n is decodable by the processor 44 operating the decoder 980.

Pre-Processing Circuits 951

The pre-processing circuits 951a-n, similar to pre-processing circuits 965a-n may be implemented within hardware circuits 950. The pre-processing circuits 951a-n may perform operations such as convolution, binning, sub-sampling and other image processing functions on image data records 967a-n (each of which is provided by the image sensor system package 111 via the interface 200 and each of which is, or is a derivative of, an image frame (full, binned, sub-sampled, and/or cropped) captured by the photo sensor array 102) to generate one or more image data records 967a-n.

Each pre-processing circuit 951a-n may receive as input either: i) an image data record 967a-n (or a window of, a binning of, or a sub-sampling of, an image data record 967a-n) directly from the image sensor system package 111 by way of the interface 200; or ii) an image data record 967a-n from a buffer memory which is the result of a different pre-processing circuit 951a-n previously operating on an image data record 967a-n (or a window of, a binning of, or a sub-sampling of, an image data record 967a-n) received from the image sensor system package 111 by way of the interface 200.

It should be noted that one image data record 967a-n (or a window of, a binning of, or a sub-sampling of, an image data record 967a-n) may be input to multiple pre-processing circuits 951a-n, resulting in multiple image data records 967a-n being written to the buffer memory for the same image data record 967a-n (or a window of, a binning of, or a sub-sampling of, an image data record 967a-n).

Further, for a burst of multiple image frames the image data record 967a-n (or a window of, a binning of, or a sub-sampling of, an image data record 967a-n) received and processed by the pre-processing circuits 951a-n may represent different image frames within the burst captured by the photo sensor array 102. The image data records 967a-n (or a window of, a binning of, or a sub-sampling of, an image data record 967a-n) received and processed by the pre-processing circuits 951a-n may be the result of applying the same pre-processing functions by pre-processing circuits 965a-n to each of multiple image frames within the burst.

Each image data record 967a-n (or a window of, a binning of, or a sub-sampling of, an image data record 967a-n) received may be input to the same one or more pre-processing circuits 951a-n or may be input to different subsets of pre-processing circuits 951a-n, each subset including one or more pre-processing circuits 951a-n.

It should also be noted that one of the pre-processing circuits 951a-n may simply write the image data record 967a-n (which may be an image frame captured by the photo sensor array 102 (full, binned, sub-sampled, and/or cropped) without previous processing by pre-processing circuits 965a-n) to the buffer memory without performing substantive image processing.

Referring again to FIG. 8, operations performed by, and derivatives of the frame of image data produced by, the pre-processing circuits 951a-n may include: i) transfer of the image data record 967a-n (or a window, binning, or sub-sampling of the image data record 967a-n) to the buffer memory as an image data record 967a-n without substantive processing; ii) binning of an image data record 967a-n (or a window or sub-sampling of the image data record 967a-n) and writing the result to the buffer memory as an image data record 967a-n; iii) subsampling of an image data record 967a-n (or a window, binning, or sub-sampling of the image data record 967a-n) and writing the result to the buffer memory as an image data record 967a-n; iv) generating a rotation of an image data record 967a-n (or a window of, a binning of, or sub-sampling of the image data record 967a-n) and writing the result to the buffer memory as an image data record 967a-n; v) generating a convolution of an image data record 967a-n (or a window or sub-sampling of the image data record 967a-n) and writing the result to the buffer memory as an image data record 967a-n; and vi); generating a double convolution, which is a second sequential convolution performed on the result of a previously performed convolution, of an image data record 967a-n (or a window or sub-sampling of the image data record 967a-n) and writing the result to the buffer memory as an image data record 967a-n. Each sequential convolution utilizes a different distinct kernel.

The pre-processing circuits 951a-n may be implemented in hardware circuits 950 to provide for image processing very quickly such that processing by a pre-processing circuit 951a-n, and thereby generating, and storing in the buffer memory, one or more image data records 967a-n may be performed during the limited amount of time that the image data records 967a-n are being transferred to the image decoding system 107 via the interface 200 without requiring storage of the transferred image data records 967a-n in memory prior to pre-processing by pre-processing circuits 951a-n.

Interface 200

As discussed, the image sensor system package 111 and the image decoding system 107 may be included in two separate packages communicating over the interface 200.

Figure 3C:
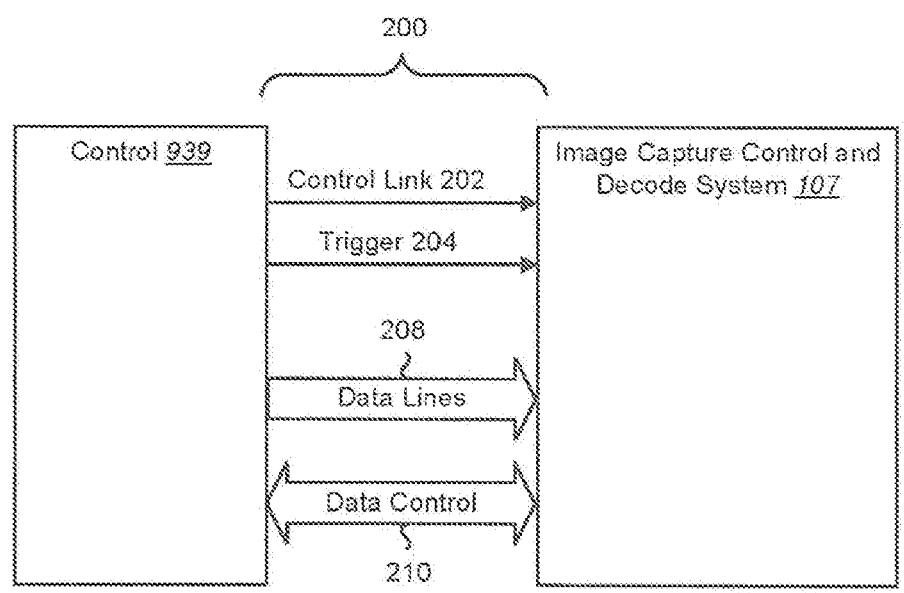
FIG. 3C shows an example of an interface between the control circuitry in the image sensor system package and the image decoding system.

FIG. 3C shows the interface 200 between the image sensor system package 111 and the image decoding system 107. The interface 200 may comprise a control link 202 that may be a two-way serial control channel enabling the image decoding system 107 to: i) set parameters (e.g., the quantity of images to be captured in a burst, exposure period for each frame, gain setting for each frame, resolution setting for each frame, or the like); ii) select which image pre-processing circuits 965a-n are to be applied to each captured frame, thereby determining the characteristics of the image data records 967a-n written to the image buffer 963; and iii) select image data records 967 for transfer to the image decoding system 107.

The interface 200 may further include a trigger signal line 204 controlled by the image decoding system 107 to initiate autonomous capture of a burst of one or more image frames and subsequent image pre-processing and writing of image data records 967a-n to the image buffer 963.

The interface 200 may further include a flash signal line 206 which is output by the image sensor system package 111 to signal the start of each exposure period and the end of each exposure period. The image decoding system 107 may control the illumination system 103 based on the flash signal on the flash signal line 206. More particularly, the image decoding system 107 may activate the illumination system 103 at the selected intensity during the exposure of each applicable frame based on the flash signal line 206 indicating start of the exposure period. The illumination system 103 may be configured to deactivate the exposure illumination when the flash signal line 206 indicates end of the exposure period activate the targeting illumination during the time period between exposure periods of sequential frames.

The interface 200 may further include data lines 208 that may be parallel or serial and that provide for the transfer of image data records 967 from the image sensor system package 111 to the image decoding system 107.

The interface 200 may further include data control signals 210 which may be signals to indicate the time each pixel value is valid on a data line, and indicate location of the pixel within the image array represented by the image data records (e.g., horizontal blanking, vertical blanking).

It should be appreciated that the barcode image is captured, processed, and stored in the first package (i.e., the image sensor system package 111) at a much faster speed and may then be transferred to the second package (the image decoding system 107) for decoding at a slower speed. The image buffer 963 may be large enough to hold an entire frame of image data (in combination with image data records 967a-n derived from the frame of image data), and the entire frame of image data and/or combinations of one or more image data records 967a-n may be read-out of the image buffer 963 after the entire frame of image data is put into the image buffer 963.

In one embodiment, instead of transferring all frames of image data captured in a burst, a subset of the multiple frames of image data generated in a burst may be transferred to the image decoding system 107 at a speed commensurate with transfer by the interface 200 via the second or slower speed.

Operation

Figure 4:
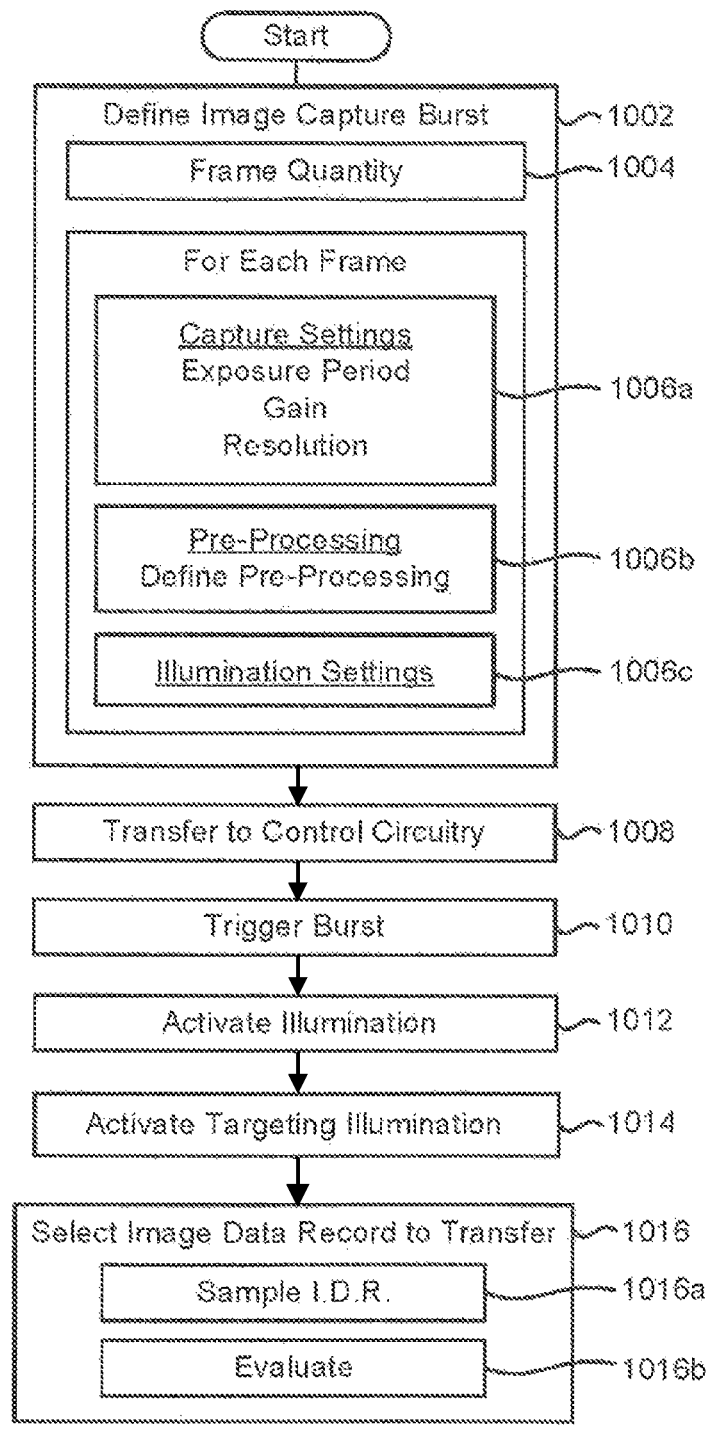
FIG. 4 illustrates an example of a method for selecting an image data record in accordance with one embodiment of the present disclosure.

Referring to FIG. 4 in conjunction with FIGS. 2 and 3A-3C, an exemplary operation of certain components of the barcode reader are represented in accordance with an embodiment of the present invention.

Step 1002 represents defining image capture parameter values for a burst of image frames to capture. In more detail, defining the image capture parameter values may comprise the decoder 980 defining the quantity of image frames to capture (full, binned, sub-sampled, and/or windowed) in sequence at sub-step 1004 and for each frame in the sequence, defining: i) image capture parameter values for the image frame such as the exposure period, gain settings, and/or resolution settings (if capturing a binned or sub-sampled image frame) at sub-step 1006a; ii) the image processing functions to which the image frame will be subject by pre-processing circuits 965a-n for purposes of defining the image data records 967a-n to be written to the image buffer 963 at sub-step 1006b; and/or iii) the illumination settings for the image frame at sub-step 1006c.

Step 1008 represents: i) transferring the image capture parameter values for the image capture burst to the control circuitry 939 of the image sensor system package 111 utilizing the bi-directional control link 202 of the interface 200; and ii) configuring the illumination logic to drive the illumination system 103 in accordance with the illumination parameters during an exposure time for capture of each image frame. It should be appreciated that image capture parameter values transferred to the control circuitry 939 do not need to include parameter values related to illumination when illumination is controlled by hardware logic 954 within the image decoding system 107. However, in an embodiment wherein the illumination logic 954 controlling the illumination system 103 is within the image sensor system package 111, then illumination parameter values may be transferred to the control circuitry 939.

Step 1010 represents driving the single trigger signal to the control circuitry 939 to initiate capture of the burst of one or more image frames, and subsequent image pre-processing and writing of image data records 967a-n to the image buffer 963 which, as discussed may be without further control by the image decoding system 107.

Step 1012 represents the illumination logic 954 receiving from the control circuitry 939 of the image sensor system package 111, for each image frame of the burst, a flash signal 1012a-c indicative of the exposure period commencement and termination for the image frame and activating the illumination system 103 in accordance with the illumination settings applicable to that image frame as defined at step 1006c.

Step 1014 represents activating targeting illumination after capturing the burst of image frames for purposes of projecting a targeting pattern of illumination into the field of view to assist the operator of the barcode reader in maintaining the desired barcode within the field of view of the barcode reader in case an additional burst of one or more image frames is required. After the barcode within the field of view has been decoded the targeting illumination may be deactivated.

Step 1016 represents selecting which image data records 967a-n (or selected portions or windows within each image data record 967a-n) are to be transferred from the image buffer 963 to the image decoding system 107. More specifically, the decoder 980 may obtain portions (e.g., samples) of one or more image data records 967a-n at sub-step 1016a and evaluate each for the quality of the image of the barcode within the image data record at sub-step 1016b to select one or more image data records 967a-n, but fewer than all image data records 967a-n, to transfer from the image buffer 963 to the image decoding system 107 for decoding.

The image data records 967a-n being transferred may have the best quality image of the barcode or other characteristics of the image of the barcode which are likely to result in a decodable barcode image. For example, the quality of an image of a barcode may be measured in terms of the contrast between light cells and dark cells within the barcode. A barcode image having relatively high contrast between dark cells and light cells may be considered to have higher quality than a barcode image having relatively low contrast between dark cells and light cells.

The superior contrast profile may mean at least one of: (i) greater maximum amplitude between the portions of the image within the subset that are dark marks of the barcode and the portions of the image within the subset that are light marks of the barcode; and (ii) more distinct transitions between portions of the image within the subset that are dark marks of the barcode and the portions of the image within the subset that are light marks of the barcode.

The terms "dark cells" and "light cells" are used herein because barcodes have traditionally been printed with ink. This gives barcodes the appearance of having dark cells (the portion that is printed with ink) and light cells (the unprinted substrate background, typically white). However, with direct part mark technology, ink is not always used and other techniques (e.g., laser/chemical etching and/or dot peening) may be used instead. Such techniques may be utilized to create a barcode by causing different portions of a substrate to have different reflective characteristics. When these different portions of the substrate are imaged, the resulting barcode image may have the appearance of including dark cells and light cells. Therefore, as used herein, the terms "dark cells" and "light cells" should be interpreted as applying to barcodes that are printed with ink as well as barcodes that are created using other technologies.

The contrast between the dark cells and the light cells in a barcode may be a function of illumination. Ideally, it is desirable to provide illumination that is consistent across the barcode and of intensity such that the exposure of the image yields both dark cells and light cells that are within the dynamic range of the photo sensor array 102. This yields better contrast than any of the following: (i) a dimly lit barcode; (ii) a brightly lit barcode wherein the image is washed out beyond the dynamic range of the photo sensor array 102; (iii) an unevenly lit barcode with bright washed out spots; or (iv) a barcode illuminated with illumination that is not compatible with the reflectivity characteristic(s) of the cells of the barcode. An example of (iv) is that illumination directed from the sides of the field of view yields a higher contrast image of a barcode formed by etching technology than does illumination parallel to the optical axis.

Also, as previously discussed, one of the pre-processing circuits 965*a*-*n* may simply write input data as an image data record 967*a*-*n* to the image buffer 963 without additional substantive processing.

As such, the structure depicted in FIG. 2 and FIG. 3A enables an image frame, as captured by the photo sensor array 102, to be written as an image data record 967 to image buffer 963 without substantive processing then subsequently transferred to the image decoding system 107 where it either: i) undergoes image pre-processing by one or more pre-processing circuits 951*a*-*n*, resulting in one or more image data records 967*a*-*n* being written to the image buffer as a result of such pre-processing; or ii) is written to the image buffer as an image data record 967*a*-*n* without pre-processing by either the pre-processing circuits 965*a*-*n* or the pre-processing circuits 951*a*-*n*.

The structure depicted in FIG. 2 and FIG. 3A also enables an image frame, as captured by the photo sensor array 102, to undergo image pre-processing utilizing one or more pre-processing circuits 965*a*-*n* and to be written to the image buffer 963 as one or more image data records 967*a*-*n* and then have one or more of the image data records 967*a*-*n* transferred to the image decoding system 107 where the transferred image data records 967*a*-*n* are: i) written to the image buffer as image data records 967*a*-*n* without further pre-processing; or ii) subjected to further pre-processing by image pre-processing circuits 951*a*-*n*, resulting in writing of image data records 967*a*-*n* to the image buffer.

Preprocessing

Examples of pre-processing will be explained hereafter. The following examples of pre-processing may be: i) performed by the pre-processing circuits 965*a*-*n* on a frame of image data received from the photo sensor array 102 to generate image data records 967*a*-*n*, which are the image frame or a derivative of the image frame, to be written to the image buffer 963; ii) performed by the pre-processing circuits 951*a*-*n* on an image data record 967*a*-*n* transferred from the image buffer 963 to the image decoding system 107 for generating an image data record 967*a*-*n* which may be the original image frame or a derivative of the original image frame.

Preprocessing Example A

In one embodiment, no image processing may be performed such that the image data record may be the image frame (whether full, windowed, binned, or sub-sampled) without substantive processing.

Preprocessing Example B

In another embodiment, portions of the image frame may be cropped horizontally or vertically such that the image data record may be a windowed portion of the image frame (whether full, binned or sub-sampled).

Preprocessing Example C

In another embodiment, the image data record may be a lower resolution frame of the original image data. One of the pre-processing circuits may bin, or average, two or more pixel intensity values to generate a single intensity value representative of a theoretical pixel that encompasses the size of all of the pixels that provided values that were binned or averaged. Multiple image data records can be generated from the same frame of image data at different resolutions. Referring to FIG. 6A: i) 220 represents binning four pixels (e.g., averaging the four intensity values) to reduce the resolution to 25% of the resolution of the input image; ii) 222 represents vertical binning of two pixels to reduce vertical resolution by 50% without affecting horizontal resolution; and iii) 224 represents horizontal binning of two pixels to reduce horizontal resolution by 50% without affecting vertical resolution. It should be noted that FIG. 6A shows examples only and the binning may include any other grouping of pixels for resolution reduction.

Preprocessing Example D

In another embodiment, binarization may be performed. The binarization may involve comparing the intensity value of each pixel, or the intensity value resulting from the binning of a group of pixels, to a threshold. If it is greater than (or equal to) the threshold, the intensity value may be converted to a first binary value, and if it is less than (or equal to) the threshold, the intensity value may be converted to a second binary value. The threshold may be common across all pixels (or binned pixel groupings) or may be different for different pixels (or binned pixel groupings). The threshold value applied to any pixel (or binned pixel groupings) may be dynamic (e.g., the threshold value may be calculated based on the intensity values previously operated on during the binarization process).

Preprocessing Example E

Figure 6B:
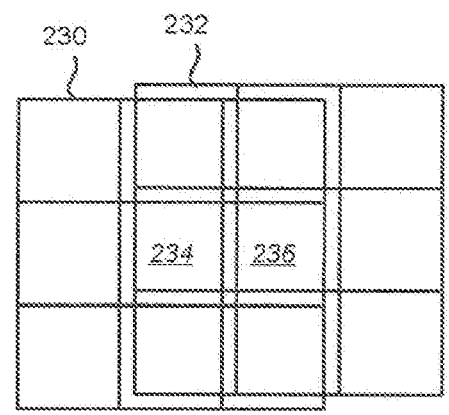

In another embodiment, a minimum/maximum processing technique may be applied to any array of pixel intensity values or any array of binned or subsampled array of intensity values. It may be applied across the entire frame of image data (or an image data record) or to only a cropped section of the frame of image data (or an image data record). Referring to FIG. 6B, an exemplary 3×3 kernel 230 encompasses 9 pixel intensity values (or 9 binned intensity values). Of those 9 intensity values, the maximum intensity value or the minimum intensity value is determined and written to the image data record in substitution for the intensity value of the center value 234 for kernel 230. The kernel is then shifted to the next center value 236 (represented by kernel 232, which is shown shifted up slightly for clarity) and the maximum or minimum value among the nine intensity values is calculated for replacement of intensity value 236.

Preprocessing Example F

Figure 6C:
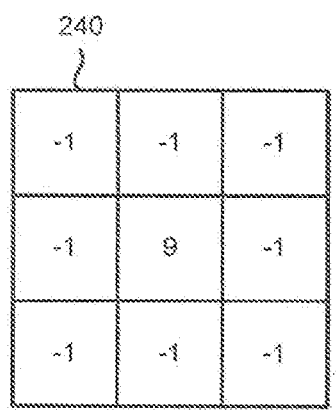

In another embodiment, convolution kernel masking may be performed. In this image processing technique, a kernel mask, such as the 3×3 kernel mask 240 as shown in FIG. 6C as an example, may be applied to a 3×3 group of pixel intensity values (or a 3×3 group of binned intensity values) to determine an intensity value to replace the center intensity value. More specifically, each intensity value is multiplied by the mask value (in the example of FIG. 6C, the center intensity value is multiplied by 8 and each surrounding intensity value is multiplied by −1) and then the resulting 9 values are averaged to determine the intensity value to replace the center intensity value. The kernel is then shifted by one pixel as described with respect to FIG. 6B to determine the intensity value for the next pixel.

Preprocessing Example G

Figure 6D:
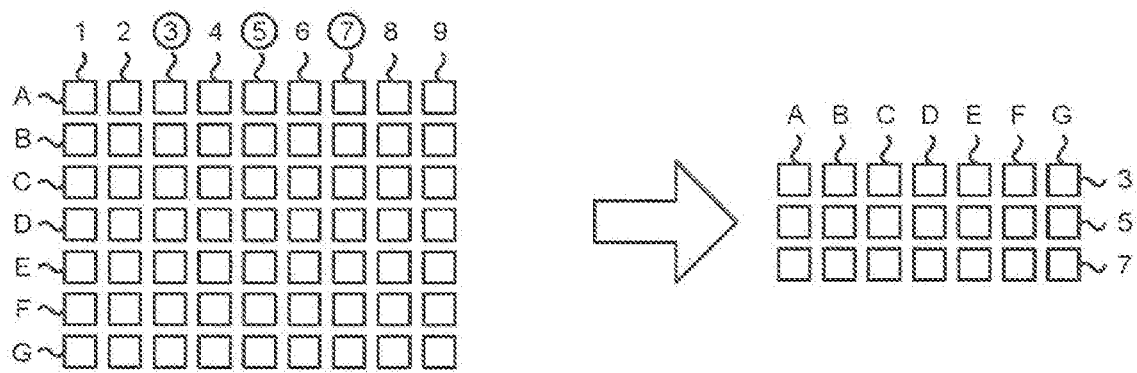

In another embodiment, a rotation may be performed as shown in FIG. 6D on an array of pixel values. More specifically, each intensity value for selected columns of the array (e.g. 3, 5, 7) may be extracted and used for intensity values of adjacent rows within an image data record. The selected columns may be adjacent columns or may be a fraction of the columns, evenly spaced, across all or a portion of the array. The array may be the image data (full, binned, sub-sampled, and/or windowed).

It should be appreciated that using one or more of the above processing techniques, image data records can be generated from the original image frame or image data records that have already been generated from the original image frame. Multiple processing techniques may be applied to the same frame of image data (or image data record) to result in different image data records derived therefrom, and the processing techniques may be applied in any order.

Sets of image data records may be generated from one or more image frames captured in a single sequence or in multiple sequences, and may be generated by a combination of the pre-processing circuits 965a-n of the image sensor system package 111 and the pre-processing circuits 951a-n of the image decoding system 107. For example, an image data record may be a frame of image data which may be an array of pixel intensity values, each pixel intensity value representing the intensity of illumination accumulating on the photo sensor pixel over the exposure period. Different image data records may each be a frame of image data captured using a different exposure period as shown in FIG. 7A, using a different gain setting, or using a different exposure period as shown in FIG. 7B. FIG. 7A shows, as an example, three image frames generated by using different exposure settings, respectively. FIG. 7B shows, as an example, four image frames that are generated using different exposure settings.

Referring to FIG. 2 in conjunction with FIG. 1, in an exemplary embodiment, the operating system 48 may include an application retrieval system 49 which obtains the barcode-reading application 24 and the applications 50a, 50b from the application server 22a or 22b. In one embodiment, the operation of the application retrieval system 49, which may obtain the barcode-reading application 24 and the other applications 50a, 50b from the application server 22a or 22b, may be the exclusive means for loading, writing, or otherwise placing the barcode-reading application 24 and the other applications 50a, 50b into the memory 46. The operating system 48 may be configured to block or prevent loading of any applications to the memory 46 by any means other than the operation of the application retrieval system 49 in a manner such that the applications 24, 50a, 50b may be retrieved exclusively from the application server 22a or 22b.

Figure 9:
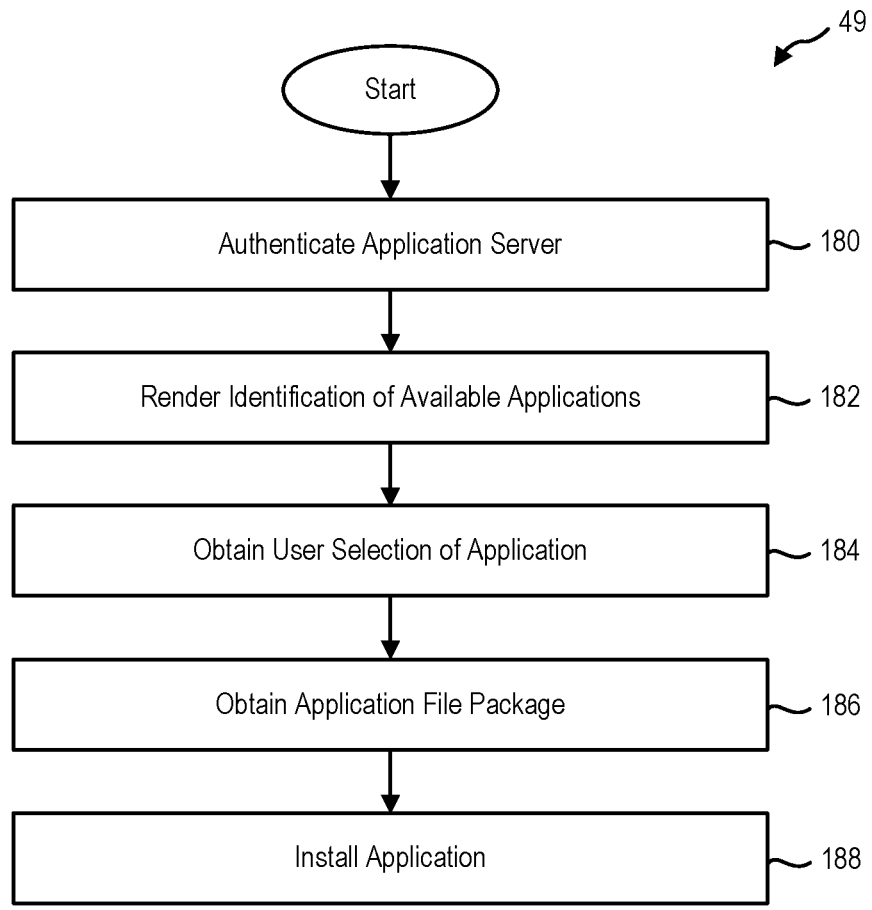
FIG. 9 is a flow diagram of an exemplary process for an operation of an application retrieval system.

FIG. 9 is a flow diagram of an exemplary process for the operation of the application retrieval system 49. Step 180 represents the application retrieval system 49 of the mobile device 18 establishing a secure connection to the application server 22a or 22b over the LAN 12, the wireless ISP network 17 and/or the Internet 16 and authenticating the application server 22a, 22b (i.e., mutual authentication between the mobile device and the application server). The mutual authentication may be established by using any conventional authentication protocol.

Step 182 represents rendering, on the display screen 66 of the mobile device 18, identification of applications which are available to the mobile device 18 for downloading. Step 184 represents obtaining user selection of an application to download.

Step 186 represents obtaining an application file package (e.g., an install package) from the application server 22a or 22b. The application file package may be temporarily stored in the memory 46 of the mobile device 18.

Step 188 represents installing the application. The installation process may include un-packing the install package and writing an executable application 50 to the memory 46.

Figure 10:
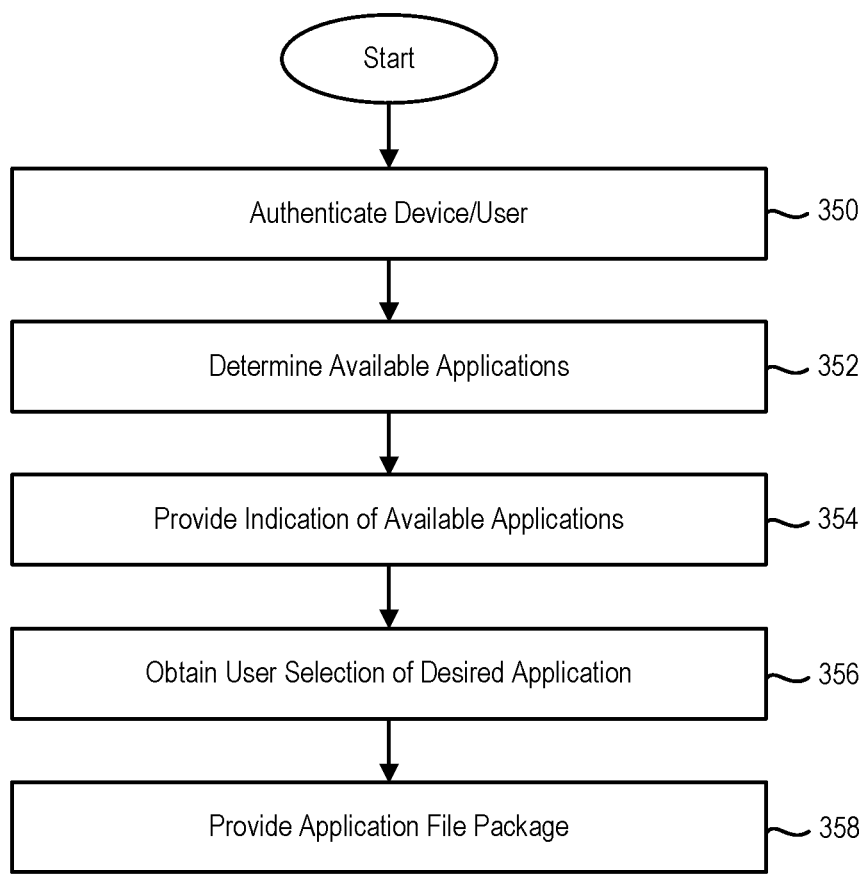
FIG. 10 is a flow diagram depicting an exemplary process for an operation of an application server.

FIG. 10 is a flow diagram depicting an exemplary process for operation of an application server 22a, 22b. Step 350 represents the application server 22a, 22b establishing a secure connection with the mobile device 18 over the LAN 12, the wireless ISP network 17, and/or the Internet 16 and authenticating the mobile device 18 and/or the user of the mobile device 18. Authenticating the user of the mobile device 18 may include: i) authenticating the individual to which the mobile device 18 is assigned or the individual using the mobile device 18, utilizing a combination of a user ID and a password or similar schemes for authenticating an individual, and/or ii) authenticating an organization, company, or other group of users to which the mobile device 18 is assigned, utilizing a combination of a user ID and a password or other similar schemes for identifying whether the mobile device 18 has been assigned to the organization, company, or group and authenticating the assignment. The user ID may be unique to each mobile device 18 or common for all mobile devices 18 assigned to the organization, company, or group.

Step 352 represents the application server 22a, 22b determining a plurality of one or more applications (the barcode-reading application 24, applications 50a, 50b, etc.) available for download based on the individual, organization, company, or other group to which the mobile device 18 is assigned.

Figure 11:
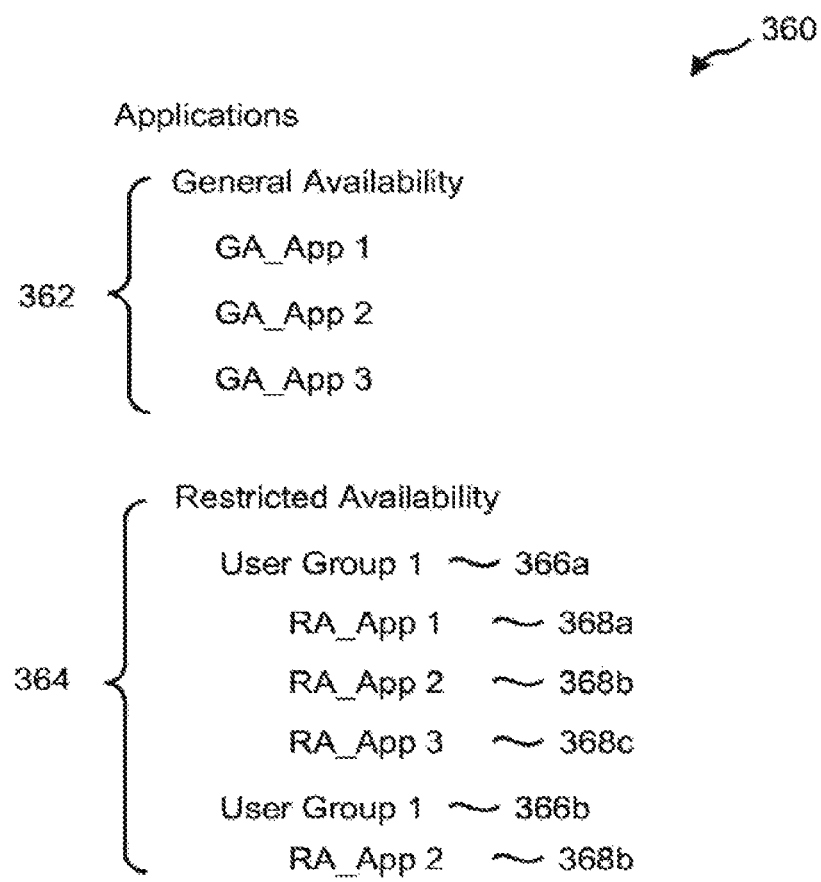
FIG. 11 shows an exemplary structure of a database of applications for downloading.

Turning briefly to FIG. 11, the application server 22a, 22b may contain, or have access to, a database 360 which identifies generally available applications 362 which are available to any mobile device 18 without regard to the identification of the user, organization, company, or group to which the mobile device 18 is assigned; and restricted applications 364 which are available only to certain individuals, organizations, companies, and groups. For restricted applications 364, the database 360 may associate each user group 366a, 366b with identification of those restricted applications 368 available to that user group 366a, 366b. Each user group may be an individual, organization, company, or other group. For example, user group 1 366a may have access to restricted applications 368a, 368b, and

368c, and user group 2 366b may have access to restricted application 368b. In each case these restricted applications may be applications written custom for the user group (and therefore are not made available to other user groups) or may be licensed to the user group (and therefore made available to those user groups which obtained a license for the application).

Returning to FIG. 10, step 354 represents the application server 22a, 22b providing an indication of the available applications to the mobile device 18. The available applications may include any of the generally available applications 362 and/or the restricted applications 364. The indication of the available applications may include, for each application, a display screen icon representing the application. The indication of available applications may not include all available applications but may include only those available applications within parameters established by the user, for example available applications which meet search criteria provided by the user. As such, step 354 may include making a search function available to the mobile device 18, obtaining search criteria or search terms from the user of the mobile device 18, and selecting matching applications that meet the search criteria from the applications available to the individual, organization, company, or group.

Step 356 represents the application server 22a, 22b obtaining a user selection of a desired application. The desired application may be one of the available applications indicated to the user at step 354.

Step 358 represents the application server 22a, 22b providing an application file package for the desired application to the mobile device 18. The application file package may be provided to the application retrieval system 49 of the mobile device 18 which is provided for writing the file package to a non-volatile memory and unpacking and loading the contents of the file package to generate instructions which, when loaded to a memory, may be executed by the processor 44.

Certain applications such as the barcode-reading application 24 may: i) require a license key from a license server 21a, 21b to enable operation of the application, ii) operate in a base mode of operation without a license key but require a license key from a license server 21a, 21b to enable at least one enhanced function to operate in an enhanced mode of operation, and/or iii) require a license key from a license server 21a, 21b to continue operating, or continue operating in the enhanced mode of operation, following the passage of time or following a threshold level of usage based on the time and/or the quantity of instances with which certain functions were performed (such as the quantity of decoding a barcode of a certain symbology or symbologies).

The at least one enhanced function may be a function of decoding a barcode symbology that the barcode-reading application 24 (e.g., the decoder) is restricted from decoding in the base mode of operation. Alternatively or additionally, the at least one enhanced function may be a function of decoding multiple barcodes in sequence at a rate that is faster than a rate at which the barcode-reading application 24 (e.g., the decoder) can decode multiple barcodes in sequence in the base mode of operation. Alternatively or additionally, the at least one enhanced function may be a function of decoding a quantity of barcodes of a particular symbology that exceeds a restricted threshold quantity of barcodes of the particular symbology that the barcode-reading application 24 (e.g., the decoder) can decode in the base mode of operation.

Alternatively or additionally, the at least one enhanced function may remove a demonstration restriction function (i.e., a demonstration factor that makes output of decoded data useful for demonstration purposes only) under which the barcode-reading application 24 functions in the base mode of operation. The demonstration restriction function may be at least one of: i) a function that scrambles decoded data from a barcode of at least one symbology, ii) a function that restricts the decoded data or scrambled decoded data from a barcode of at least one symbology from being made available for further processing, or iii) a function that restricts the decoded data or the scrambled decoded data from a barcode of at least one symbology from being displayed on a display screen of the mobile device 18.

Alternatively or additionally, the at least one enhanced function may enable at least one enhanced image processing function that improves an ability to decode an image of a barcode and is not operable when the decoder operates in the base mode of operation. The enhanced image processing function may include preforming additional image processing algorithms which alter the image captured by the camera assembly (which may include the optic system 104 and the photo sensor array 102) prior to execution of the algorithms which attempt to decode a barcode depicted within the image.

In accordance with another embodiment, the base mode of operation may include a base decoding mode of operation and a demonstration mode of operation. In the base decoding mode of operation, the barcode-reading application 24 may drive the camera assembly to capture an image of a barcode and apply base decoder functions to the image to identify a barcode symbology. The barcode-reading application 24 may decode the barcode and make decoded data available for further processing if the barcode symbology is a base symbology, and enter the demonstration mode of operation if the barcode symbology is not the base symbology.

In the demonstration mode of operation, the barcode-reading application 24 may apply at least one enhanced barcode-reading function to decode the barcode, and perform at least one of: i) outputting an indication of successful decoding of the barcode, or ii) implementing a restriction function. The restriction function may be at least one of: i) a function that scrambles decoded data, ii) a function that restricts the decoded data or scrambled decoded data from being made available for further processing by at least one application executing on the mobile device, or iii) a function that restricts the decoded data or the scrambled decoded data from being displayed on a display screen of the mobile device 18.

The barcode-reading application 24 may perform an upgrade function in the demonstration mode of operation. The upgrade function may enable user selection to obtain the license code, obtain the license code based on the user selection, establish a network connection to the licensing server 21a, 21b, and obtain the license code from the licensing server 21a, 21b.

In order to obtain the license code from the licensing server 21a, 21b, the barcode-reading application 24 may communicate to the licensing server 21a, 21b one of: i) a unique identification code of the mobile device 18, or ii) a user identification code identifying a controller of the mobile device 18.

In accordance with another embodiment, the barcode-reading application 24 (e.g., a decoder application) running on the processor 44 of the mobile device 18 may be configured to control the camera assembly of the mobile device 18 to capture an image of a barcode. The image of the barcode may be affected by at least one optic system of the camera assembly. The decoder application may utilize a base decoder function for attempting to decode a barcode if an enhanced decoder mode has not been authorized for the mobile device 18, and utilize an enhanced decoder function for attempting to decode the barcode if the enhanced decoder mode has been authorized for the mobile device 18.

The enhanced decoder function may include a function of decoding a barcode symbology that the decoder application is restricted from decoding if the enhanced decoder mode has not been authorized for the mobile device 18. Alternatively or additionally, the enhanced decoder function may include a function of decoding multiple barcodes in sequence at a rate that is faster than a restricted rate at which the decoder application can decode a sequence of multiple barcodes if the enhanced decoder mode has not been authorized for the mobile device 18. Alternatively or additionally, the enhanced decoder function may include a function of decoding a quantity of barcodes of a particular symbology that exceeds a restricted quantity of barcodes of the particular symbology which the decoder application can decode if the enhanced decoder mode has not been authorized for the mobile device 18. Alternatively or additionally, the enhanced decoder function may remove a demonstration restriction function (i.e., a demonstration factor that makes output of decoded data useful for demonstration purposes) under which the decoder application functions when the enhanced decoder mode has not been authorized for the mobile device 18, thereby making decoded data from a barcode of a particular symbology available for further processing by an application executing on the mobile device 18. The demonstration restriction function may be at least one of: i) a function which scrambles decoded data from a barcode of at least one particular symbology, ii) a function which restricts the decoded data or scrambled decoded data from a barcode of at least one particular symbology from being made available for further processing by at least one application executing on the mobile device 18, or iii) a function which restricts the decoded data or the scrambled decoded data from a barcode of at least one particular symbology from being displayed on a display screen of the mobile device 18. Alternatively or additionally, the enhanced decoder function may enable at least one enhanced image processing function which improves an ability to decode an image of a barcode and is not operable if the enhanced decoder mode has not been authorized for the mobile device 18. The enhanced decoder mode may be authorized by obtaining a license code from a licensing server 21a, 21b.

The decoder application may be configured to subject the license code to a predetermined algorithm to determine at least one operating permission authorized by the license code. The enhanced decoder function may correspond to the at least one operating permission authorized by the license code. The decoder application or any other application may be further configured to obtain the license code from the licensing server 21a, 21b by communicating to the licensing server one of: i) a unique identification code of the mobile device 18, or ii) a user identification code identifying a controller of the mobile device 18.

The barcode-reading application 24 (and the decoder application) disclosed above may be embodied on a computer-readable medium. The barcode-reading application 24 (and the decoder application) includes instructions executable by the processor 44 of the mobile device 18 for performing the functions disclosed above.

Figure 12B:
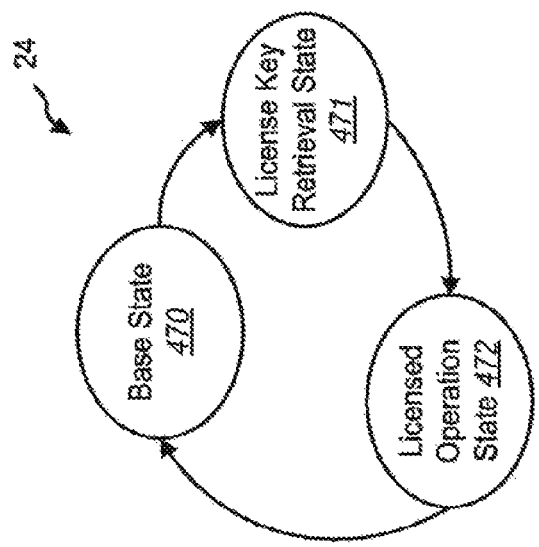
FIG. 12B is a state machine diagram depicting three states of operation in a barcode-reading application in accordance with another embodiment.
Figure 12A:
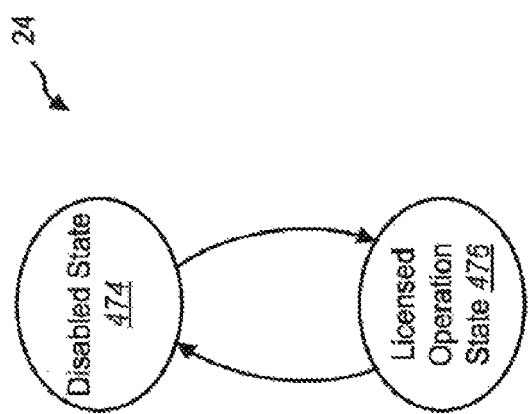
FIG. 12A is a state machine diagram depicting two states of operation in a barcode-reading application in accordance with one embodiment.

FIG. 12A is a state machine diagram depicting two states of operation in a barcode-reading application 24 in accordance with one embodiment. The first state of operation may be a disabled state 474 (which may also be referred to as a base state). In the disabled state 474, at least one function of the barcode-reading application 24 is disabled such that the barcode-reading application 24 may not output useful decoded data for further processing or transmission by the barcode-reading application 24 but may be capable of connecting to a licensing server 21a, 21b to obtain a license to transition the barcode-reading application 24 to a licensed operation state 476 (which may also be referred to as an enhanced operation state). The at least one function that may be disabled includes: i) an image capture function which, if enabled, would enable capturing an image of a barcode for image processing and decoding, ii) a decoding function which, if an image of a barcode is captured, would decode the image of the barcode to generate decoded data, iii) a data processing function which, if decoded data is generated, would process the decoded data as part of a useful workflow, and/or iv) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16.

The licensed operation state 476 may enable the function(s) that is/are disabled when the barcode-reading application 24 is in the disabled state 474 such that the barcode-reading application 24 may be capable of capturing an image of a barcode for image processing and decoding, decoding the image of the barcode to generate decoded data, and performing, as applicable: i) a data processing function which, if decoded data is generated, would process the decoded data as part of a useful workflow, and ii) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16.

There may be two sub-embodiments of the licensed operation state 476. In a first sub-embodiment, all of the functions of the barcode-reading application 24 may be enabled. In a second sub-embodiment, all functions of the barcode-reading application 24 may be enabled except restrictions on the output of useful decoded data may be implemented. The restrictions may be specified in the license key which transitions the barcode-reading application 24 from the disabled state 474 to the licensed operation state 476. The restrictions may be symbology restrictions, time restrictions, and/or quantity restrictions.

Figure 13:
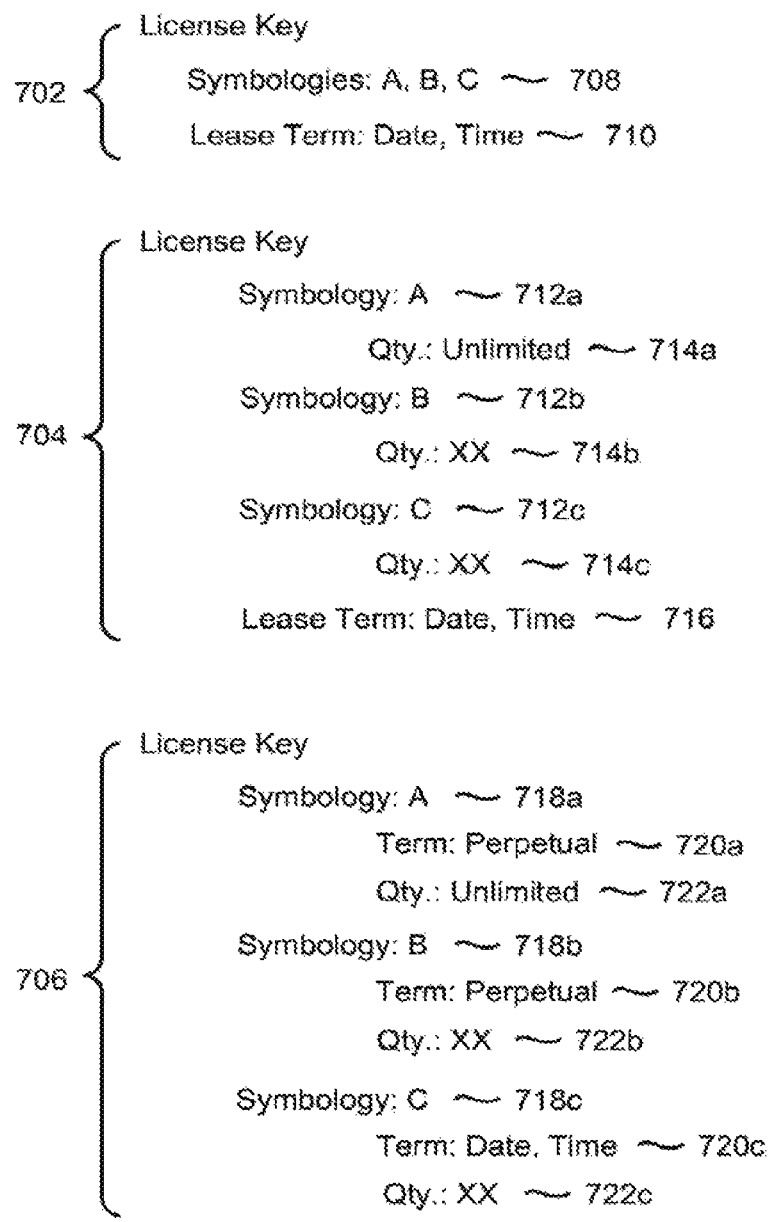
FIG. 13 shows examples of a data structure of a license key in accordance with some embodiments.

FIG. 13 shows examples of a data structure of a license key in accordance with some embodiments. A first example license key 702 may include data fields (that may be encrypted) which specify the symbologies 708 (for example, symbologies A, B, and C that correspond to a Universal Product Code (UPC), a Quick Response (QR) Code, and a Portable Data File (PDF)-417) and a lease term 710. The lease term 710 may specify a date and time at which the license key 702 expires. In response to receipt of this license key 702 (and decryption of the license key 702 if encrypted) the barcode-reading application 24 may transition to the licensed operation state 476, decode the specified symbologies 708 when in the licensed operation state 476 (while remaining disabled for decoding other symbologies not specified in the license, for example for a data matrix), and at the end of the lease term 710, transition back to the disabled state 474 (unless a new license key with an updated lease term 710 is received prior to expiration, which functions to extend the expiration of the lease term).

A second example license key 704 may include data fields (that may be encrypted) which specify the symbologies 712a-c (for example, symbologies A, B, and C that correspond to a UPC, a QR Code, and a PDF-417), and a licensed quantity of decodes 714a-c for each symbology 712a-c. The licensed quantity of decodes for a particular symbology, for example the licensed quantity 714a for symbology 712a, may be unlimited. The licensed quantity of decodes 714b-c for symbologies 712b-c may be limited to a specified quantity. The entire license key 704 may further include a lease term 716 which may specify a date and time at which the license key 704 expires. In response to receipt of this license key 704 (and decryption of the license key 704 if encrypted) the barcode-reading application 24 may transition to the licensed operation state 476, and decode the specified symbologies 712a-c when in the licensed operation state 476 up to the licensed quantities 714a-c. The barcode-reading application 24 may remain disabled for decoding other symbologies not specified in the license (e.g., symbologies other than 712a-c), automatically disable each of symbologies 712b-c when the total quantity of decodes of each symbology 712b-c exceeds the licensed quantity 714b-c (unless a new license key increases the quantity), and transition back to the disabled state 474 (unless a new license key with an updated lease term 710 is received prior to expiration, which functions to extend the expiration of the lease term). In this arrangement, the ability to decode symbologies 712b-c will expire upon the earlier of: i) reaching the maximum quantity of decodes 714b-c, or ii) expiration of the lease term 716.

A third example license key 706 may include data fields (that may be encrypted) which specify the symbologies 718a-c (for example, symbologies A, B, and C that correspond to a UPC, a QR Code, and a PDF-417), a license term 720a-c for each symbology 718a-c, and a licensed quantity 722a-c for each symbology 718a-c. The license term 720a-c may specify a date and time at which the license for that particular symbology 718a-c expires. The license term may be perpetual (e.g., license term 720a-b) or time limited (e.g., license term 720c). The licensed quantity of decodes for a particular symbology may be unlimited (e.g., the licensed quantity 722a for symbology 718a), or may specify a specific quantity (e.g., the licensed quantity 722b-c for symbologies 718b-c).

In response to receipt of this license key 706 (and decryption of the license key 706 if encrypted) the barcode-reading application 24 may transition to the licensed operation state 476, and decode the specified symbologies 718a-c when in the licensed operation state 476 up to the licensed quantities 722a-c for each symbology and for the duration of the license term 720a-c for each symbology. The barcode-reading application 24 may remain disabled for decoding other symbologies not specified in the license (e.g., symbologies other than 718a-c), and automatically disable each of symbologies 718b-c when the earlier of: i) the expiration of the license term 720a-c for each symbology 718a-c expires, or ii) the total quantity of decodes of each symbology 718b-c exceeds the licensed quantity 722b-c, each being subject to extension by a new license key with an increased term duration or an increased quantity.

Each of the license keys may be a data file, specifying the symbologies, the license terms, and the license quantities as depicted in FIG. 13. The data file may be encrypted utilizing an encryption key (e.g., a private key of a public/private key pair). The encrypted data file may form the license key and may be decrypted by the barcode-reading application 24 utilizing an encryption key (e.g., a public key of the public/private key pair). Other known encryption technologies may also be utilized for securing the delivery of the license key to the barcode-reading application including the license restrictions (e.g., licensed symbologies, license terms, and licensed quantities) within the license key.

FIG. 12B is a state machine diagram depicting three states of operation in a barcode-reading application 24 in accordance with another embodiment. The first state of operation may be a base state 470. When in the base state, the barcode-reading application 24 may include barcode-reading capabilities which, although functional and capable of generating useful decoded data, are limited by at least one factor or function (which will be referred to as a demonstration factor) which makes output of decoded data useful for demonstration purposes but not practical for ongoing operation.

The operation of the barcode-reading application 24 in the base state may be a base decoding mode of operation or a demonstration mode of operation. In the base decoding mode of operation, the barcode-reading application 24 may drive the camera of the mobile device 18 to capture an image of a barcode, and apply base decoder functions to the image to identify the barcode symbology. If the barcode symbology is a base symbology, the barcode-reading application 24 may decode the barcode and make the decoded data available for further processing. If the symbology is other than a base symbology, the barcode-reading application 24 may enter the demonstration mode of operation.

In the demonstration mode of operation, the barcode-reading application 24 may apply at least one unlicensed enhanced barcode-reading function to decode the barcode, and perform at least one of: i) outputting an indication of successfully decoding the barcode, or ii) implementing a restriction function. The restriction function may be at least one of: i) a function which scrambles decoded data; ii) a function which restricts the decoded data or scrambled decoded data from the barcode from being made available for further processing by at least one application executing on the mobile device; or iii) a function which restricts the decoded data or the scrambled decoded data from the barcode from being displayed on a display screen of the mobile device.

The at least one demonstration factor may include, but is not limited to: i) a scrambling function which, upon generating decoded data, provides the output in a scrambled or truncated format for purposes of demonstrating decoding capabilities (and decoder performance) but preventing use of the decoded data for further data processing, ii) a time delay function which, upon generating and outputting decoded data (or scrambled decoded data), provides for implementing a time delay before a barcode of the same symbology can again be successfully decoded, iii) an output restriction function which restricts decoded data (or scrambled decoded data) from being made available for further processing by at least one application executing on the mobile device 18, and iv) an output restriction function which enables outputting decoded data (or scrambled decoded data) to the display screen and prevents the decoded data from being further processed by the mobile device 18 (other than presentation on the display screen) or transmission to a remote application.

The demonstration mode of operation may include an upgrade function. The upgrade function may enable user selection to obtain the license code and upon user selection to obtain the license code, establish the network connection to the licensing server and obtain the license code from the licensing server 21a, 21b.

The at least one demonstration factor may be applied to selected symbologies or all symbologies. Different demonstration factors may be applied to different symbologies.

The barcode-reading application 24 may transition from the base state 470 to a license key retrieval state 471. Reading a barcode to which a demonstration factor applies may trigger transition of the barcode-reading application 24 to the license key retrieval state 471. Alternatively, the barcode-reading application 24 may transition to the license key retrieval state 471 upon user selection of the license key retrieval state 471.

When in the license key retrieval state 471 the barcode-reading application 24 may connect to a licensing server 21a, 21b to obtain a license key. After obtaining the license key, the barcode-reading application 24 may transition to a licensed operation state 472 (i.e., an enhanced operation state).

The licensed operation state 472 may enable the barcode-reading application 24 to function without limitations of the at least one demonstration factor such that the barcode-reading application 24 may be capable of capturing an image of a barcode for image processing and decoding, decoding the image of the barcode to generate decoded data, and performing, as applicable: i) a data processing function which, if decoded data is generated, would process the decoded data as part of a useful workflow, and ii) a data transmission function which, if decoded data is generated and/or processed by the barcode-reading application 24, would make the decoded data available to another local application (e.g., another application on the mobile device 18) or a remote application (e.g., another application or database on any of the host computer 19, a local server coupled to the LAN 12, or a remote server coupled to the Internet 16), in each case without being impeded by the demonstration factor.

As described with respect to the licensed operation state 476 in FIG. 12A, there may be two sub-embodiments of the licensed operation state 472. In a first sub-embodiment, all of the functions of the barcode-reading application 24 may be enabled. In a second sub-embodiment, all functions of the barcode-reading application 24 may be enabled except restrictions on the output of useful decoded data may be implemented. The restrictions may be specified in the license key which transitions the barcode-reading application 24 to the licensed operation state 472. The restrictions may be symbology restrictions, time restrictions, and/or quantity restrictions.

Figure 14A:
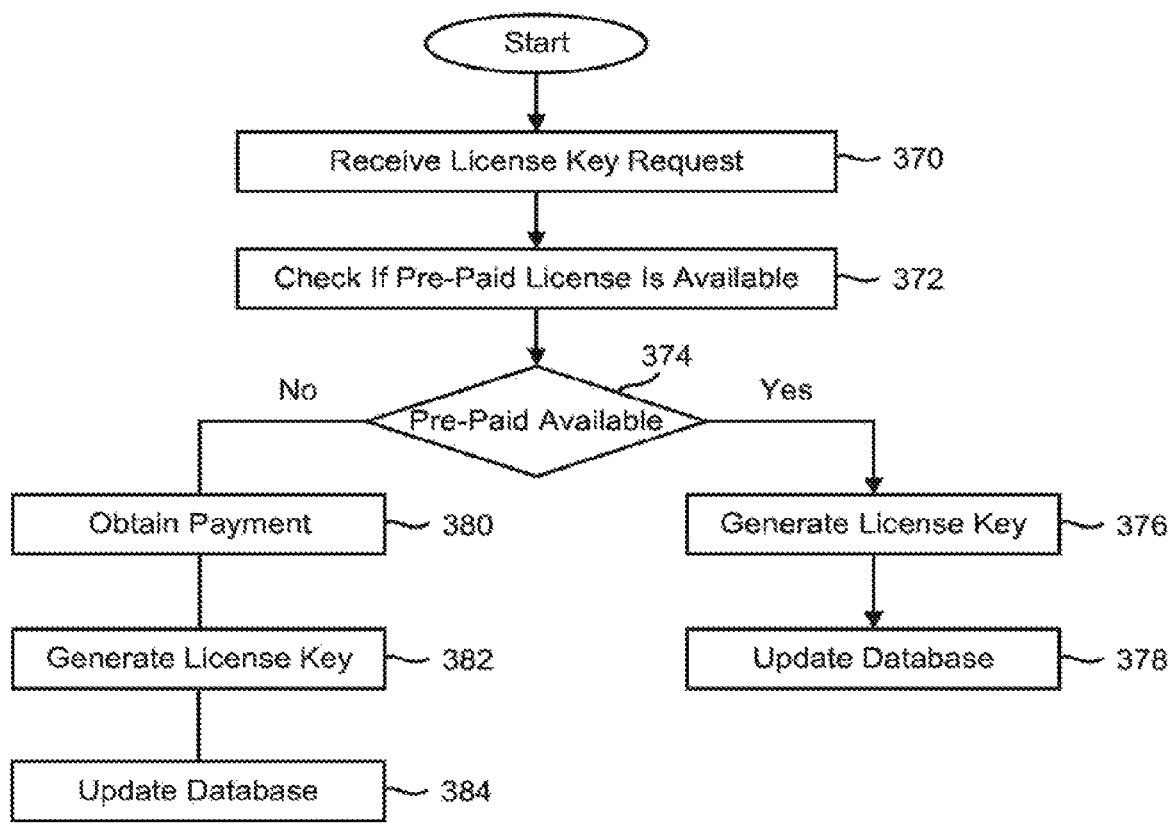
FIG. 14A depicts an exemplary operation of a license server.

FIG. 14A depicts an exemplary operation of a license server 21a, 21b. Step 370 represents receiving a license key request from the barcode-reading application 24 (or other application) of the mobile device 18. Receiving the license key request may include authenticating the user of the mobile device 18. Authenticating the user of the mobile device 18 may include: i) authenticating the individual to which the mobile device is assigned or the individual using the mobile device (or the individual who controls the mobile device), for example utilizing a combination of a user ID and a password or similar schemes for authenticating an individual, and/or ii) authenticating an organization, company, or other group of users to which the mobile device is assigned, for example utilizing a combination of a user ID and a password or other similar schemes for identifying whether the device has been assigned to the organization, company, or group and authenticating the assignment. The user ID may be unique to the device or common for all mobile devices 18 assigned to the organization, company, or group.

Step 372 represents the license server 21a, 21b checking whether a pre-paid license is available for the mobile device 18. More specifically, the identity of the individual, organization, company, or other group of users identified during the authentication may be used to look up (e.g., in a license database) licenses available to that individual, organization, company, or other group of users (if any). For a particular individual, organization, company, or other group of users, a certain quantity of licenses may have been pre-purchased.

FIG. 14C depicts an exemplary database 739 for recording pre-paid licenses that may have been purchased by an individual, organization, company or other group of users. Each such individual, organization, company or other group of users may be identified by a group ID 740, 750. Associated with each group ID is one or more license IDs 742, 752a, 752b, each of which identifies a license type for the barcode-reading application 24 which may have been purchased in quantities of one or more. Each license type may be, as an example, one of the license types identified by the license keys 702, 704, 706 of FIG. 13.

Each license ID 742, 752a, 752b may be associated with identification of: i) the quantity of the license type purchased 744, 754a, 754b, ii) the quantity used 746 or the quantity in use 756a, 756b, and/or iii) the quantity remaining 748, 758a, 758b for issuance to mobile devices 18. It should be appreciated that recording both the quantity used 746 or the quantity in use 756a, 756b as well as the quantity remaining 748, 758a, 758b for issuance to mobile devices is duplicative as either value can be calculated from the quantity purchased 744, 754a, 754b and the other value.

Recording the quantity used 746 is useful when licenses are purchased for a single mobile device, and once a license is issued to a particular mobile device it is permanently associated with that mobile device and may not be re-assigned to another mobile device without manual intervention.

Recording the quantity in use 756a, 756b is useful when the licenses are concurrent-use licenses, and when a license assigned to a mobile device expires it is considered no longer in-use and can be reassigned to another mobile device 18.

It should also be appreciated that if the quantity of licenses purchased is unlimited 754a, it is irrelevant to track in-use licenses 756a, 756b and remaining licenses 758a, 758b. When utilizing the concurrent-use licenses, for the in-use licenses 756b, the database may include an in-use table 760 which records, for each license 762, the time 764 at which it expires (e.g., the lease term 710 from FIG. 13) such that upon expiration (if the expiration is not updated by way of renewal), the license will revert to remaining inventory 758b and can be issued to a different mobile device 18.

It should be appreciated that this licensing scheme enables a mobile device 18 to obtain a license for a specific term, and so long as the mobile device 18 obtains a renewal license prior to expiration, the barcode-reading application 24 can operate under the license even if the mobile device is (periodically) uncoupled from any network and unable to contact the license server 21a, 21b.

Returning to FIG. 14A, step 374 represents determining whether a pre-paid license is available. If a prepaid license is available at step 374, a license key for the pre-paid license is generated at step 376 and the database 739 is updated at step 378. Updating the database may include recording the license as used 746 or in use 756b.

If it is determined at step 374 that a pre-paid license is not available, payment is obtained for a license at step 380. Step 380 may involve determining the type of license being requested (e.g., as identified by license keys 702, 704, 706), including the licensed symbology(ies) as well as license term(s) and license quantity(ies) for each symbology(ies). In one embodiment, the barcode-reading application 24 may, under the control of the license server 21a, 21b, generate a menu for user selection of these license parameters (i.e., symbologies, license terms and license quantities) and display on a screen of the mobile device 18 pricing alternatives for desired license parameters.

After payment is obtained, a license key for the license is generated at step 382 and the database 739 is updated at step 384 to reflect a newly purchased license for a user (group ID). If the newly purchased license is a concurrent-use license, updating the database may include recording the license as well as its expiration.

As stated, this licensing scheme enables a mobile device 18 to obtain a license for a specific term, and so long as the mobile device 18 obtains a renewal license prior to expiration, the barcode-reading application 24 can continue operation under the license even if the mobile device 18 is uncoupled from any network and unable to contact the license server 21a, 21b.

Figure 14B:
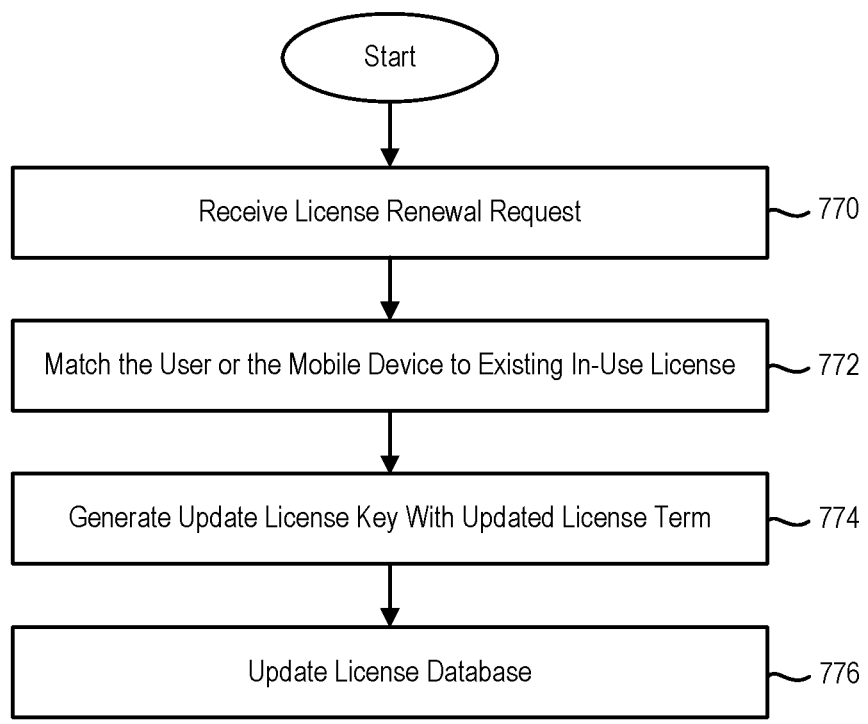
FIG. 14B depicts an exemplary operation of a license server for renewing a license for a mobile device prior to expiration of the license.

FIG. 14B depicts an exemplary operation of a license server 21a, 21b for renewing a license for a mobile device 18 prior to the expiration of the license (e.g., prior to the in-use license 756b reverting to a remaining license 758b).

Step 770 represents receiving a license key renewal request from the barcode-reading application 24 (or other application) of the mobile device 18. Receiving the license key renewal request may include authenticating the user of the mobile device 18. Authenticating the user of the mobile device 18, as discussed, may include: i) authenticating the individual to which the mobile device is assigned, or the individual using the mobile device (or the individual who controls the mobile device), for example utilizing a combination of a user ID and a password, or similar schemes for authenticating an individual, and/or ii) authenticating an organization, company, or other group of users to which the mobile device is assigned, for example utilizing a combination of a user ID and a password or other similar schemes for identifying whether the device has been assigned to the organization, company, or group and authenticating the assignment. The user ID may be unique to the device or common for all mobile devices 18 assigned to the individual, organization, company, or group. The mobile device 18 (e.g., the barcode-reading application) may communicate to the licensing server i) a unique identification code of the mobile device 18 or ii) a user identification code identifying a controller of the mobile device 18.

Step 772 represents the license server 21a, 21b matching the user or the mobile device 18 to the existing in-use license, which may be recorded in an in-use table (for example, the in-use table 760 shown in FIG. 14C).

Step 774 represents generating, and providing to the mobile device 18, an update license key which, as depicted by license key 702 of FIG. 13, may include an updated license term.

Step 776 represents updating the license database such that the expiration date of the license in the in-use table 760 is updated.

As discussed above, the barcode reading system 100 shown in FIG. 2 includes a camera (including an optic system 104 and a photo sensor array 102) coupled to a decoder 980 (which is part of a barcode-reading application 24 that is stored in memory 46 and executed by the processor 44) via a communication interface 200. The interface 200 between the camera and the decoder 980 may be relatively slow. For example, the camera may be able to capture image frames much more quickly than the image frames can be transferred across the interface 200 to the decoder 980.

One aspect of the present disclosure is related to improving the overall performance of a barcode reading system 100 that includes a slow interface 200 between the camera and the decoder 980. For example, aspects of the present disclosure may be directed to improving the overall decoding speed in such a barcode reading system 100.

Generally speaking, in order to improve the overall decoding speed in a barcode reading system 100 that includes a slow interface 200 between the camera and the decoder 980, it may be desirable to reduce the transmission of poor quality (undecodable) image frames across the interface 200. In addition, it may be desirable to reduce the amount of processing that is performed on the host side (i.e., the image decoding system 107, including the decoder 980).

Figure 15:
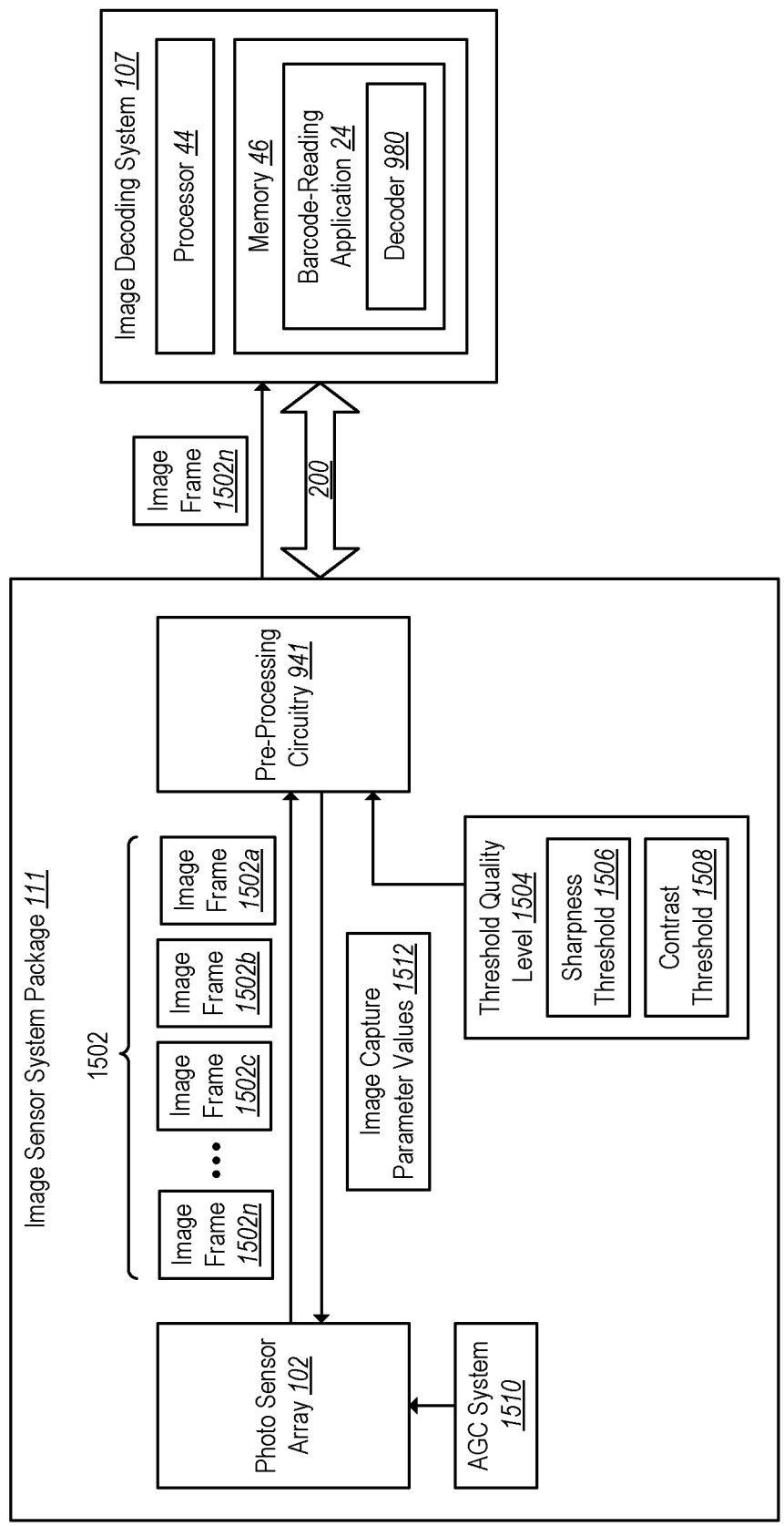
FIG. 15 illustrates an example of a barcode reading system that includes pre-processing circuitry configured to evaluate quality of image frames in accordance with the present disclosure.

Reference is made to FIG. 15. In accordance with one aspect of the present disclosure, the barcode reading system 100 may be configured so that only image frames 1502 that meet a certain level of quality are transferred across the interface 200 to the decoder 980. For example, pre-processing circuitry 941 coupled to the camera may be configured to evaluate the quality of image frames 1502 that are captured by the camera before those image frames 1502 are transferred across the interface 200 to the decoder 980. The pre-processing circuitry 941 may be configured so that image frames 1502 that meet a certain level of quality are transferred to the decoder 980, and image frames 1502 that do not meet a certain level of quality are discarded without being transferred. In other words, the image frames 1502 may be selectively transferred to the decoder 980 based on image quality.

In the barcode reading system 100 of FIG. 2, the camera includes a photo sensor array 102, which is included in an image sensor system package 111. As discussed above, the pre-processing circuitry 941 may also be included in the image sensor system package 111. The pre-processing circuitry 941 may be coupled to the camera. In particular, the pre-processing circuitry 941 may be coupled to the photo sensor array 102 via the A/D converter 987 and the wide bus logic 955.

In the barcode reading system 100 of FIG. 2, the decoder 980 is included in an image decoding system 107. In particular, the decoder 980 may be included in a barcode-reading application 24, which is stored in memory 46 and executed by the processor 44. As discussed above, the image sensor system package 111 and the image decoding system 107 may be included in two separate packages, each of which may include one or more silicon dies. The image sensor system package 111 may be coupled to the image decoding system 107 via the interface 200.

The pre-processing circuitry 941 may be configured to determine whether image frames 1502 captured by the photo sensor array 102 satisfy a threshold quality level 1504. The pre-processing circuitry 941 may also be configured to effect transfer of the image frames 1502 that satisfy the threshold quality level 1504 to the image decoding system 107, and to discard the image frames 1502 that do not satisfy the threshold quality level 1504 without transferring such image frames 1502 to the image decoding system 107.

More specifically, instead of sending each image frame 1502 that is captured by the photo sensor array 102 across the interface 200 to the image decoding system 107 to be processed by the barcode-reading application 24 (specifically, the decoder 980 within the barcode-reading application 24), the pre-processing circuitry 941 may evaluate the image frames 1502 and only effect transfer of those image frames 1502 that meet a threshold quality level 1504. For example, if the pre-processing circuitry 941 determines that the first several image frames 1502a-c captured by the photo sensor array 102 do not meet the threshold quality level 1504, these image frames 1502a-c may be discarded without being transferred across the interface 200 to the image decoding system 107. If, however, the pre-processing circuitry 941 determines that a subsequently captured image frame 1502n meets the threshold quality level 1504, the pre-processing circuitry 941 may effect transfer of this image frame 1502n across the interface 200 to the image decoding system 107 to be processed by the decoder 980.

To determine whether an image frame 1502 satisfies the threshold quality level 1504, the pre-processing circuitry 941 may evaluate one or more characteristics of the image frame 1502 and compare those characteristics to defined criteria. If the characteristics of the image frame 1502 satisfy the defined criteria, then the pre-processing circuitry 941 may interpret this to mean that the image frame 1502 satisfies the threshold quality level 1504 and should be transferred to the image decoding system 107. If, however, the characteristics of the image frame 1502 do not satisfy the defined criteria, then the pre-processing circuitry 941 may interpret this to mean that the image frame 1502 does not satisfy the threshold quality level 1504 and should be discarded instead of being transferred to the image decoding system 107.

In some embodiments, the pre-processing circuitry 941 may evaluate the contrast and/or the sharpness of the image frames 1502 that are captured by the photo sensor array 102.

As used herein, the term "contrast" refers to the difference in brightness between different parts of an image frame. As discussed above, a barcode may include both light cells and dark cells. A barcode image having relatively high contrast between dark cells and light cells (i.e., a barcode image in which the difference in brightness between dark cells and light cells is significant) may be considered to have higher quality than a barcode image having relatively low contrast between dark cells and light cells (i.e., a barcode image in which the difference in brightness between dark cells and light cells is less significant).

As used herein, the term "sharpness" refers to the clarity of detail in an image frame. In the context of a barcode image, sharpness may refer to the amount of contrast at the edges between dark cells and light cells. A barcode image in which the edges between dark cells and light cells have relatively high contrast may be considered to possess greater sharpness than a barcode image in which the edges between dark cells and light cells have relatively low contrast. Moreover, a barcode image having a relatively high degree of sharpness may be considered to have higher quality than a barcode image having a relatively low degree of sharpness.

There are a variety of different methods that may be utilized to evaluate the contrast and/or sharpness of an image frame 1502. In at least some of these methods, one or more metrics may be determined for the contrast and/or the sharpness of an image frame 1502. These metrics may be compared to one or more thresholds.

In some embodiments, the pre-processing circuitry 941 may be configured so that it does not effect transfer of an image frame 1502 to the image decoding system 107 unless i) the contrast of the image frame 1502 exceeds a contrast threshold 1508, and ii) the sharpness of the image frame 1502 exceeds a sharpness threshold 1506. Alternatively, the pre-processing circuitry 941 may be configured so that it effects transfer of an image frame 1502 to the image decoding system 107 if either condition i) or condition ii) is satisfied.

The image sensor system package 111 may include an automatic gain control (AGC) system 1510 that is capable of setting image capture parameter values 1512 for the camera (including the photo sensor array 102). As discussed above, the barcode reading system 100 may be implemented in a device (e.g., a mobile device, such as a smartphone or tablet) that may be used for a variety of different purposes. The camera in such a device may be used to take photographs, capture video, etc. The AGC system 1510 may be used to set the image capture parameter values 1512 for the camera.

In some embodiments, the pre-processing circuitry 941 may, under some circumstances, set the image capture parameter values 1512 for the camera instead of the AGC system 1510. For example, the pre-processing circuitry 941 may set the image capture parameter values 1512 for the camera when the camera is being used to read barcodes. The pre-processing circuitry 941 may set the image capture parameter values 1512 based on its evaluation of image frames 1502 captured by the photo sensor array 102. In other words, if one or more characteristics of an image frame 1502 do not satisfy the criteria for being transferred to the image decoding system 107, then the pre-processing circuitry 941 may adjust the image capture parameter values 1512 so that future image frames 1502 will be more likely to satisfy the criteria. For example, if the pre-processing circuitry 941 determines that the sharpness and/or contrast of the image frames 1502 do not meet the requisite thresholds 1506, 1508, the pre-processing circuitry 941 may adjust the gain and/or the exposure used by the photo sensor array 102 to capture future image frames 1502.

It is not necessary, however, for the pre-processing circuitry 941 to set image capture parameter values 1512 for the camera. In some embodiments, the pre-processing circuitry 941 may be configured so that it only evaluates and selectively transfers (or effects transfer of) image frames 1502, without setting image capture parameter values 1512. In such embodiments, the AGC system 1510 in the image sensor system package 111 may set the image capture parameter values 1512 for the camera.

In some embodiments, the image frames 1502 may be compressed prior to being transferred across the communication interface 200. Compression quality can vary based on the frame rate. Generally speaking, it is desirable to have good compression quality at an acceptable frame rate (e.g., 5-10 frames per second).

There are several different ways that the pre-processing circuitry 941 may effect transfer of image frames 1502 (specifically, those image frames 1502 that satisfy the threshold quality level 1504) to the image decoding system 107. In some embodiments, the pre-processing circuitry 941 may itself send the image frames 1502 that satisfy the threshold quality level 1504 to the image decoding system 107. In other embodiments, instead of directly sending the image frames 1502 to the image decoding system 107, the pre-processing circuitry 941 may instead take some action that causes the image frames 1502 to be sent to the image decoding system 107.

Figure 16:
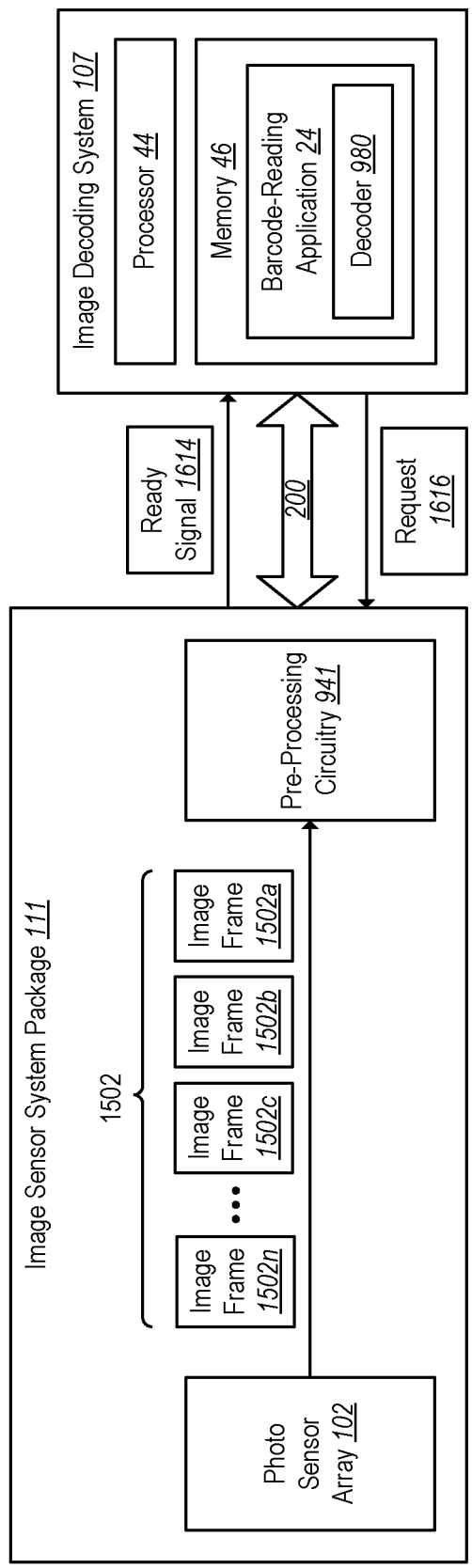
FIG. 16 illustrates an example showing how the pre-processing circuitry may effect transfer of image frames to the image decoding system in accordance with the present disclosure.

For example, referring to FIG. 16, in some embodiments the image decoding system 107 may be configured so that it only requests an image frame 1502 from the image sensor system package 111 in response to receiving a ready signal 1614. In embodiments where the image decoding system 107 is configured in this manner, the pre-processing circuitry 941 may effect transfer of an image frame 1502 to the image decoding system 107 by sending a ready signal 1614 to the image decoding system 107.

Reference is again made to the example considered previously, where the pre-processing circuitry 941 determines that the first several image frames 1502a-c captured by the photo sensor array 102 do not meet the threshold quality level 1504. These image frames 1502a-c may be discarded without sending a ready signal 1614 to the image decoding system 107. Once the pre-processing circuitry 941 determines that an image frame 1502n meets the threshold quality level 1504, the pre-processing circuitry 941 may send a ready signal 1614 to the image decoding system 107. In response to receiving the ready signal 1614, the image decoding system 107 may send a request 1616 to the image sensor system package 111 for the image frame 1502n. Both the ready signal 1614 and the request 1616 may be sent via the interface 200.

Figure 17:
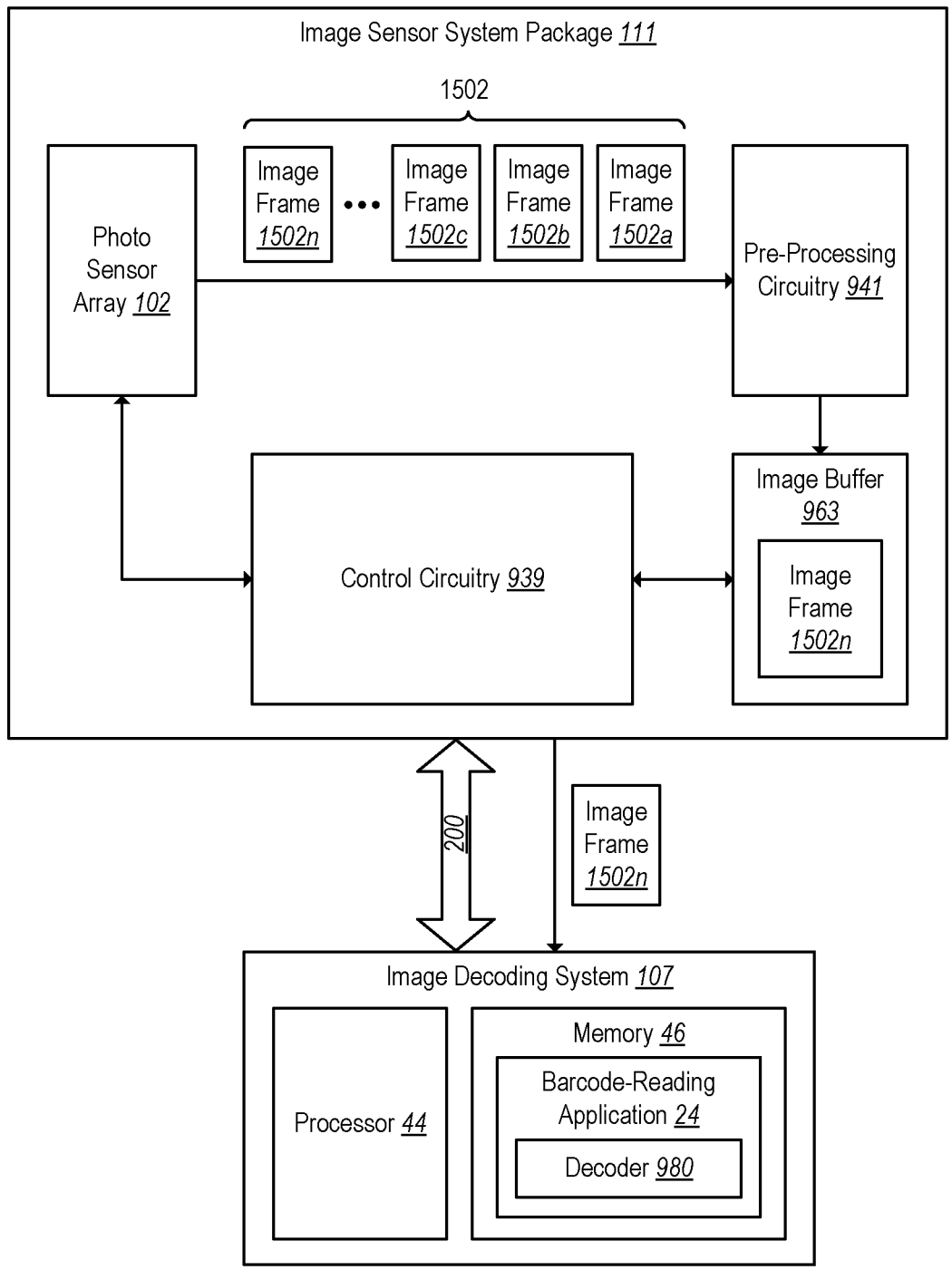
FIG. 17 illustrates another example showing how the pre-processing circuitry may effect transfer of image frames to the image decoding system in accordance with the present disclosure.

Another possible approach for effecting transfer of image frames 1502 to the image decoding system 107 will be discussed in relation to FIG. 17. As discussed previously, the image sensor system package 111 may include control circuitry 939 and an image buffer 963. In some embodiments, the control circuitry 939 may be configured so that it transfers any image frames 1502 that are stored in the image buffer 963 to the image decoding system 107. In embodiments where the control circuitry 939 is configured in this manner, the pre-processing circuitry 941 may effect transfer of an image frame 1502 to the image decoding system 107 by simply transferring the image frame 1502 to the image buffer 963.

Reference is again made to the example considered previously, where the pre-processing circuitry 941 determines that the first several image frames 1502a-c captured by the photo sensor array 102 do not meet the threshold quality level 1504. These image frames 1502a-c may be discarded without being transferred to the image buffer 963. Once the pre-processing circuitry 941 determines that an image frame 1502n meets the threshold quality level 1504, the pre-processing circuitry 941 may transfer this image frame 1502n to the image buffer 963. When the control circuitry 939 detects the image frame 1502n in the image buffer 963, the control circuitry 939 may, in response, transfer the image frame 1502n to the image decoding system 107 across the interface 200.

Figure 18:
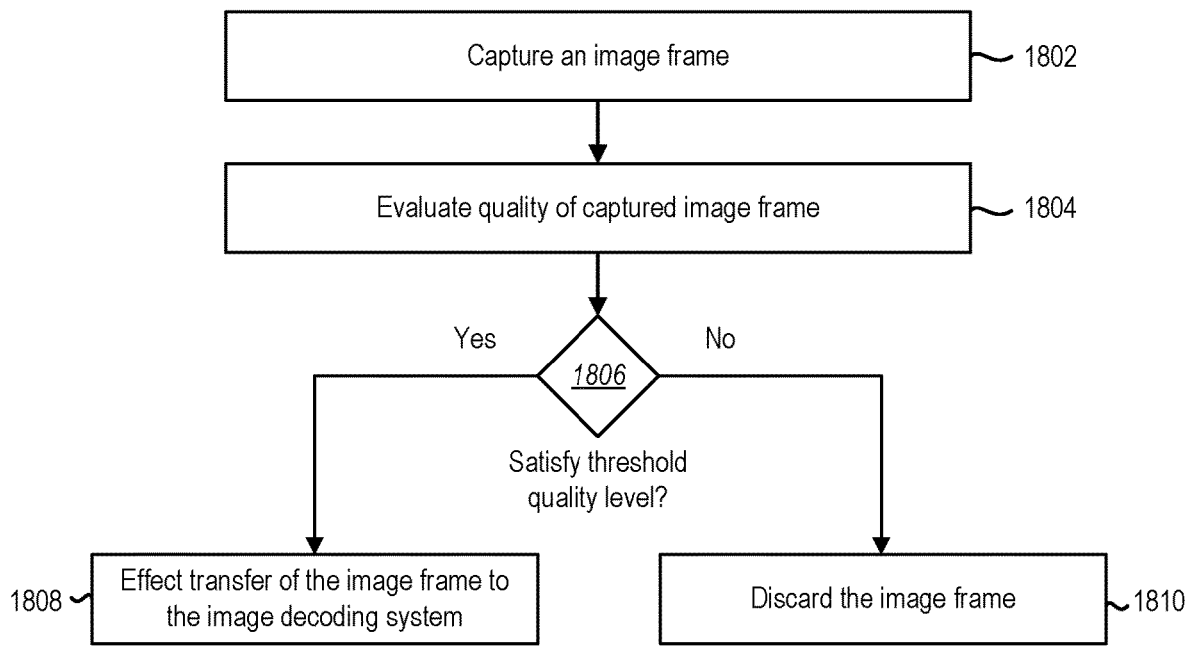
FIG. 18 illustrates a method for improving decoding speed in a barcode reading system that includes a slow interface between the camera and the decoder.

FIG. 18 illustrates a method 1800 for improving decoding speed in a barcode reading system 100 that includes a slow interface 200 between the camera (including an optic system 104 and a photo sensor array 102) and the decoder 980. For the sake of simplicity, the method 1800 will be described in relation to the capture of a single image frame 1502. However, a camera in a barcode reading system 100 typically captures many image frames 1502 in rapid sequence. The operations shown in the depicted method 1800 may be performed for multiple image frames 1502. In some embodiments, the operations shown in the depicted method 1800 may be performed for each image frame 1502 that is captured by the camera.

In accordance with the method 1800, the camera may capture 1802 an image frame 1502. Pre-processing circuitry 941 may evaluate 1804 the quality of the captured image frame 1502. More specifically, the pre-processing circuitry 941 may determine 1806 whether the image frame 1502 satisfies a threshold quality level 1504. For example, as discussed above, the pre-processing circuitry 941 may evaluate 1804 one or more characteristics of the image frame 1502 (e.g., sharpness, contrast) and compare those characteristics to defined criteria (e.g., a sharpness threshold 1506, a contrast threshold 1508).

If the image frame 1502 satisfies the threshold quality level 1504, then the pre-processing circuitry 941 effects transfer 1808 of the image frame 1502 across the interface 200 to the image decoding system 107. More specifically, the pre-processing circuitry 941 effects transfer 1808 of the image frame 1502 to the decoder 980. The pre-processing circuitry 941 may either directly send the image frame 1502 to the decoder 980, or the pre-processing circuitry 941 may instead take some action that causes the image frames 1502 to be sent to the decoder 980. The method 1800 then returns to capturing 1802 another image frame 1502, and proceeds as described above.

If, however, the pre-processing circuitry 941 determines 1806 that the image frame 1502 does not satisfy the threshold quality level 1504, then the pre-processing circuitry 941 discards 1810 the image frame 1502 without effecting transfer of the image frame 1502 to the decoder 980. The method 1800 then returns to capturing 1802 another image frame 1502, and proceeds as described above.

Figure 19:
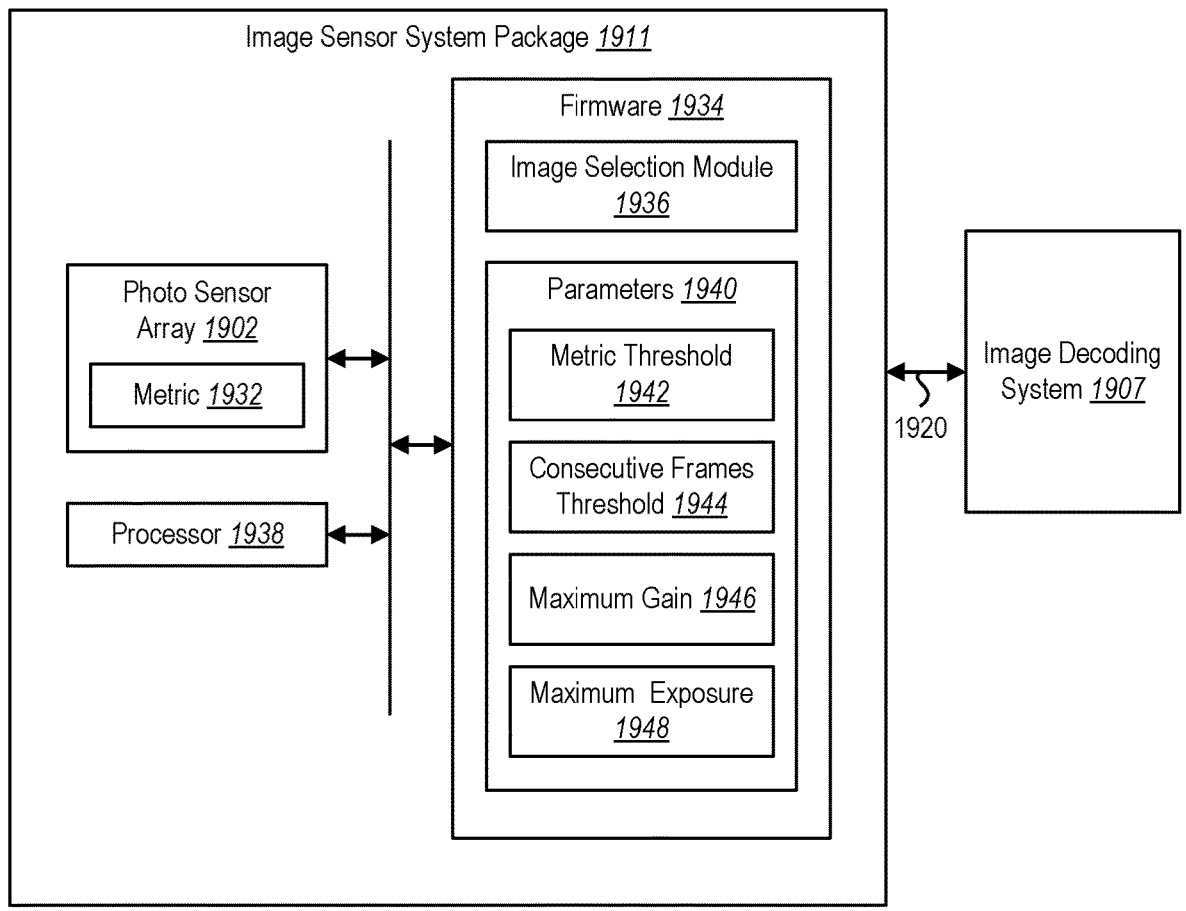
FIG. 19 illustrates another embodiment of a barcode reading system in accordance with the present disclosure.

FIG. 19 illustrates another embodiment of a barcode reading system 1900 in accordance with the present disclosure. The barcode reading system 1900 is similar in some respects to the barcode reading system 100 described previously. For example, the barcode reading system 1900 includes an image sensor system package 1911 having a photo sensor array 1902. The barcode reading system 1900 also includes an image decoding system 1907. The image decoding system 1907 may be configured similarly to the image decoding system 107 discussed previously. The image sensor system package 1911 may be coupled to the image decoding system 1907 via a communication interface 1920, which may be similar to the communication interface 200 described previously.

Like the image sensor system package 111 in the barcode reading system 100 described previously, the image sensor system package 1911 may include circuitry configured to determine whether image frames 1502 captured by the photo sensor array 1902 satisfy a threshold quality level. However, instead of using pre-processing circuitry 941 to implement this functionality, a metric 1932 that is provided by the photo sensor array 1902 may be utilized.

The metric 1932 may be a measure of a characteristic of an image frame 1502 captured by the photo sensor array 1902 (e.g., the most recently captured image frame 1502). The metric 1932 may be updated each time the photo sensor array 1902 captures a new image frame 1502. The image sensor system package 1911 may include an image selection module 1936 that is configured to read and evaluate the metric 1932. The image selection module 1936 may be included within firmware 1934 and executed by a processor 1938.

The firmware 1934 may also include several parameters 1940 that may be used by the image selection module 1936 in connection with evaluating the metric 1932. These parameters 1940 may include a metric threshold 1942, a consecutive frames threshold 1944, a maximum gain 1946, and a maximum exposure 1948. These parameters 1940 will be discussed in greater detail in connection with FIGS. 20 and 21.

Figure 20:
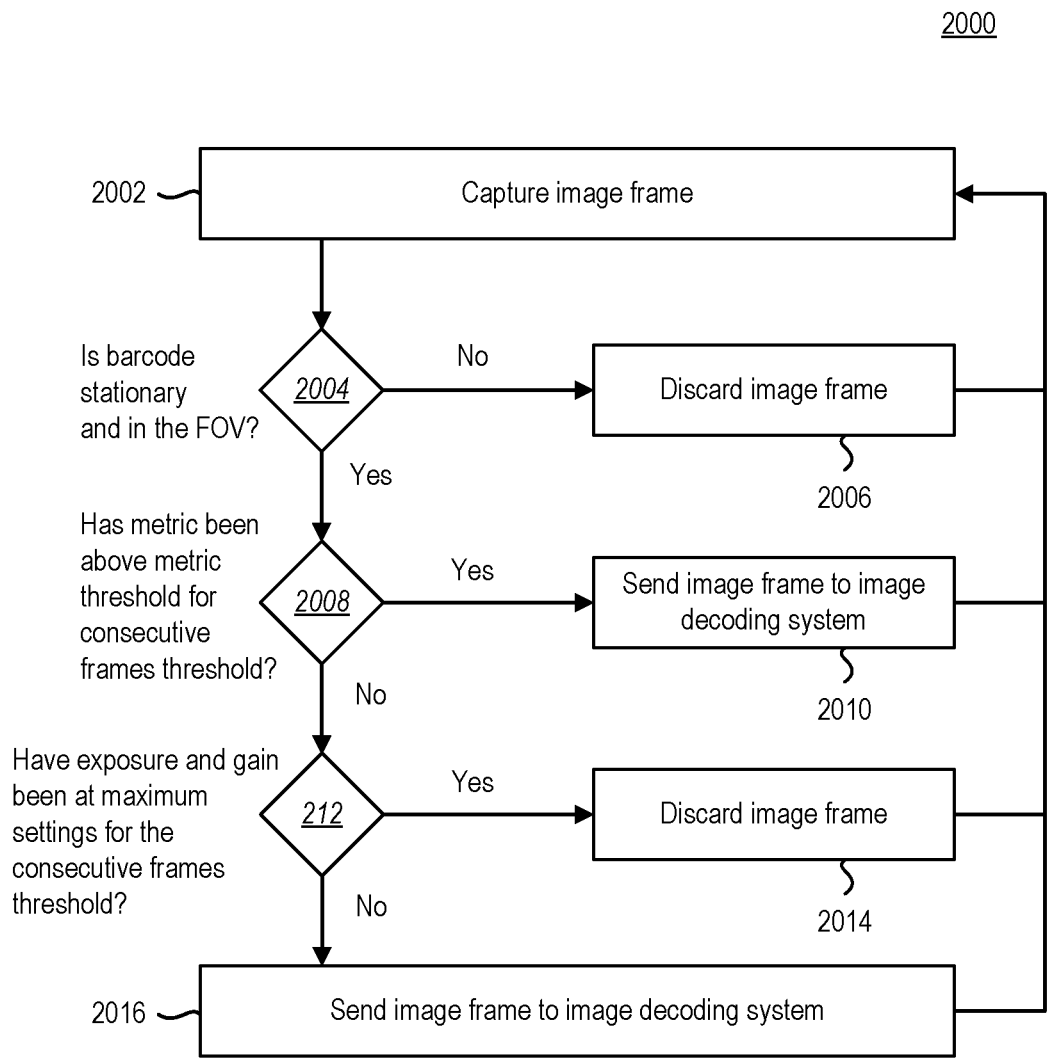
FIG. 20 is a flow diagram that illustrates a method for using a metric provided by the photo sensor array to determine whether image frames captured by the photo sensor array satisfy a threshold quality level.

FIG. 20 is a flow diagram that illustrates a method 2000 for using a metric 1932 provided by the photo sensor array 1902 to determine whether image frames 1502 captured by the photo sensor array 1902 satisfy a threshold quality level. The image selection module 1936 may be configured to implement this method 2000. The method 2000 may be implemented when the photo sensor array 1902 is in a continuous capture mode such that the photo sensor array 1902 is continuously capturing image frames 1502.

In accordance with the method 2000, an image frame 1502 may be captured 2002. In response to capturing 2002 the image frame 1502, a determination may be made 2004 about whether the image frame 1502 includes a barcode within the field of view and the barcode is stationary (not blurry). If the image frame 1502 does not include a barcode within its field of view, or the barcode is not stationary, then the image frame 1502 may be discarded 2006. The method 2000 may then return to capturing 2002 another image frame 1502.

If, however, it is determined 2004 that the image frame 1502 includes a barcode within the field of view and the barcode is stationary, then a determination may be made 2008 about whether the metric 1932 has been above a defined metric threshold 1942 for a certain number of consecutive image frames 1502 (as defined by a consecutive frames threshold 1944). If it has, then it may be concluded that the image frame 1502 satisfies the threshold quality level, and the image frame 1502 may be sent 2010 to the image decoding system 1907. The method 2000 may then return to capturing 2002 another image frame 1502.

If the metric 1932 has not been above the metric threshold 1942 for the consecutive frames threshold 1944, then a determination may be made 2012 about whether the exposure and gain settings of the photo sensor array 1902 have been at their maximum values (the maximum gain 1946 and the maximum exposure 1948) for the consecutive frames threshold 1944. If not, the image frame 1502 may be discarded 2014, and the method 2000 may return to capturing 2002 another image frame 1502. If, however, the exposure and gain settings of the photo sensor array 1902 have been at their maximum values for the consecutive frames threshold 1944, then the image frame 1502 may be sent 2016 to the image decoding system 1907. The method 2000 may then return to capturing 2002 another image frame 1502.

Figure 21:
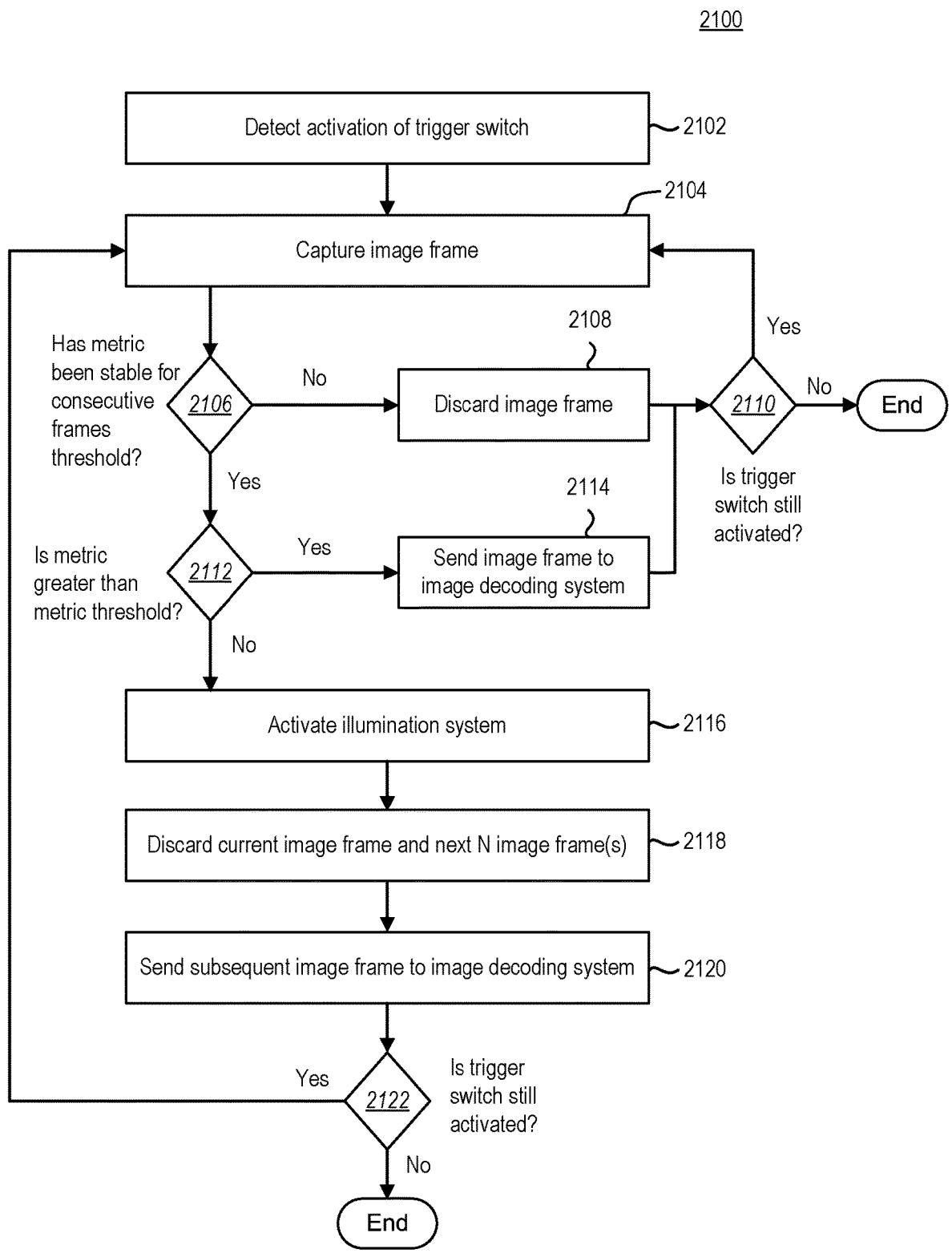
FIG. 21 is a flow diagram that illustrates another method for using a metric provided by the photo sensor array to determine whether image frames captured by the photo sensor array satisfy a threshold quality level.

FIG. 21 is a flow diagram that illustrates another method 2100 for using a metric 1932 provided by the photo sensor array 1902 to determine whether image frames 1502 captured by the photo sensor array 1902 satisfy a threshold quality level. The image selection module 1936 may be configured to implement this method 2100. The method 2100 may be implemented when the photo sensor array 1902 is in a mode wherein it does not capture an image frame 1502 unless a trigger switch 942 within the barcode reading system 1900 is activated.

In accordance with the method 2100, activation of a trigger switch 942 may be detected 2102. In response, an image frame 1502 may be captured 2104. In response to capturing 2104 the image frame 1502, a determination may be made 2106 about whether the metric 1932 has been stable (e.g., within a defined range of values) for a certain number of consecutive image frames 1502 (as defined by the consecutive frames threshold 1944). If not, then the image frame 1502 may be discarded 2108. If it is determined 2110 that the trigger switch 942 is still activated, the method 2100 may then return to capturing 2104 another image frame 1502. Otherwise, the method 2100 may end.

If, however, it is determined 2106 that the metric 1932 has been stable for the consecutive frames threshold 1944, then a determination may be made 2112 about whether the metric 1932 is greater than the metric threshold 1942. If it is, then the image frame 1502 may be sent 2114 to the image decoding system 1907. If it is determined 2110 that the trigger switch 942 is still activated, the method 2100 may then return to capturing 2104 another image frame 1502. Otherwise, the method 2100 may end.

If it is determined 2112 that the metric 1932 is not greater than the metric threshold 1942, then an illumination system 103 of the barcode reading system 1900 may be activated 2116. The current image frame 1502 and the next N image frames 1502 (where N is an integer) may be discarded 2118, and the subsequent image frame 1502 may be sent 2120 to the image decoding system 1907. If it is determined 2122 that the trigger switch 942 is still activated, the method 2100 may then return to capturing 2104 another image frame 1502.

Figure 22:
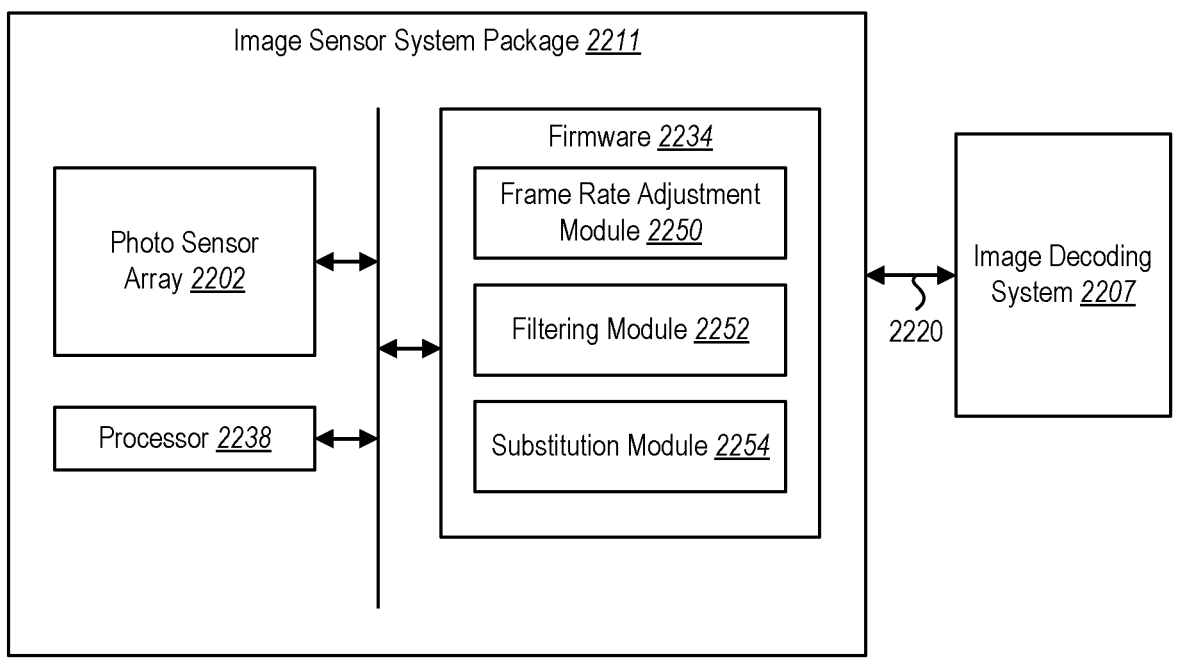
FIG. 22 illustrates another embodiment of a barcode reading system in accordance with the present disclosure.

FIG. 22 illustrates another embodiment of a barcode reading system 2200 in accordance with the present disclosure. Like the barcode reading system 1900 described previously, the barcode reading system 2200 includes an image decoding system 2207 coupled to an image sensor system package 2211 via a communication interface 2220. The image sensor system package 2211 includes a photo sensor array 2202 and a processor 2238.

In the depicted embodiment, the firmware 2234 within the image sensor system package 2211 is shown with several different examples of modules that may be utilized to improve the performance of the barcode reading system 2200. In particular, the firmware 2234 is shown with a frame rate adjustment module 2250, a filtering module 2252, and a substitution module 2254. These modules may be executed by the processor 2238 to implement the functionality described below.

The frame rate adjustment module 2250 may be configured to dynamically adjust the frame rate of image transfer, i.e., the rate at which image frames 1502 are transferred across the communication interface 2220 to the image decoding system 2207. For example, a certain frame rate may be defined as the default frame rate. If an image frame 1502 is captured that is too large to be transferred across the communication interface 2220 at the default frame rate, the frame rate adjustment module 2250 may increase the frame rate in order to permit the image frame 1502 to be transferred.

The filtering module 2252 may be configured to filter at least some of the image frames 1502 before they are transferred across the communication interface 2220 to the image decoding system 2207. In some embodiments, the image frames 1502 that exceed a certain threshold size may be filtered before being transferred. Other image frames 1502 that do not exceed the threshold size may be transferred without being filtered. Alternatively, in other embodiments, all image frames 1502 may be filtered before being transferred.

Figure 23:
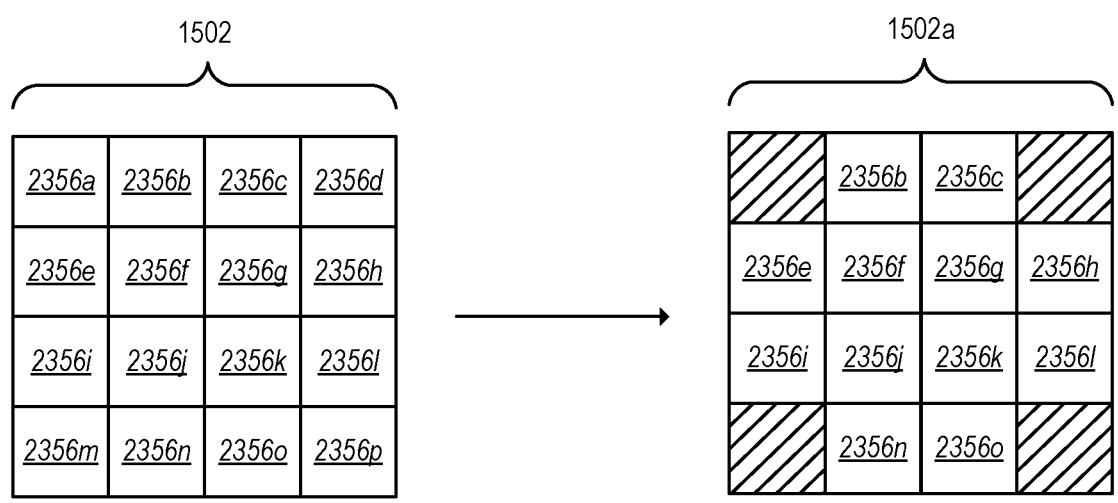
FIG. 23 illustrates an example showing how at least some of the image blocks of an image frame may be replaced with pre-identified data.

Referring both to FIGS. 22 and 23, an image frame 1502 may be transferred to the image decoding system 2207 as image blocks 2356a-p. The substitution module 2254 may be configured to replace at least some of the image blocks 2356a-p of an image frame 1502 with pre-identified data. In the example shown in FIG. 23, image blocks 2356a, 2356d, 2356m, 2356p have been replaced with pre-identified data, thereby forming a modified image frame 1502a. The pre-identified data may be recognizable by the image decoding system 2207 as data that can be discarded. The pre-identified data may be smaller in size than the image blocks 2356a, 2356d, 2356m, 2356p that are being replaced. In some embodiments, the image blocks 2356a, 2356d, 2356m, 2356p that are replaced may correspond to parts of the image frame 1502 that do not include a barcode, or parts of the image frame 1502 that are not necessary to decode a barcode.

Although the image sensor system package 2211 is shown with three different modules 2250, 2252, 2254 in the embodiment shown in FIG. 22, it is not necessary for the image sensor system package 2211 to include all of these modules 2250, 2252, 2254. In alternative embodiments, the image sensor system package 2211 may include only one or two of the depicted modules 2250, 2252, 2254. For example, an image sensor system package 2211 may include a frame rate adjustment module 2250 for dynamically adjusting the frame rate of image transfer, without being configured to perform filtering or replacement of image blocks.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the terms "coupled" and "connected" refer to components being in electrical communication with each other and/or mechanically affixed to each other, depending on the context, whether directly (i.e., without any intermediate components) or indirectly (i.e., via one or more intermediate components).

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A barcode reading system, comprising:
   an image decoding system comprising a processor, memory, and a decoder stored in the memory;
   a communication interface;
   a camera coupled to the image decoding system via the communication interface, the camera comprising a photo sensor array configured to capture frames of image data at a frame rate, wherein the communication interface is not capable of transferring the frames of image data to the image decoding system at the frame rate; and
   pre-processing circuitry configured to perform one or more operations on the frames of image data that decimate a first portion of each of the frames of image data and effect transfer of at least a second portion of each of at least some of the frames of image data, wherein the second portion of each of the at least some of the frames of image data satisfies a threshold quality level suitable for decoding.

2. The barcode reading system of claim 1, wherein the pre-processing circuitry is additionally configured to determine whether the second portion of each of the frames of image data satisfies the threshold quality level suitable for decoding.

3. The barcode reading system of claim 2, wherein determining whether the second portion of each of the frames of image data satisfies the threshold quality level suitable for decoding comprises:
   determining whether a sharpness of the second portion exceeds a sharpness threshold; and
   determining whether a contrast of the second portion exceeds a contrast threshold.

4. The barcode reading system of claim 2, wherein the one or more operations comprise cropping or windowing.

5. The barcode reading system of claim 2, wherein the pre-processing circuitry is additionally configured to set image capture parameter values for the photo sensor array.

6. The barcode reading system of claim 2 further comprising an automatic gain control system that sets the image capture parameter values for the photo sensor array, wherein the pre-processing circuitry does not set image capture parameter values for the photo sensor array.

7. The barcode reading system of claim 2, wherein effecting transfer of the second portion of each of the at least some of the frames of image data comprises sending the second portion of each of the at least some of the frames of image data to the image decoding system via the communication interface.

8. The barcode reading system of claim 2, wherein:
   the image decoding system is configured so that it does not request any image data until it receives a ready signal; and
   effecting transfer of image data to the image decoding system comprises sending the ready signal to the image decoding system.

9. A barcode reading system, comprising:
   an image decoding system comprising a processor, memory, and a decoder stored in the memory;
   a communication interface;
   a camera coupled to the image decoding system via the communication interface, the camera comprising a photo sensor array configured to capture image frames at a frame rate, wherein the communication interface is not capable of transferring the image frames to the image decoding system at the frame rate; and pre-processing circuitry configured to perform one or more operations on the image frames to generate image data records and to effect transfer of at least some of the image data records to the image decoding system via the communication interface based on image quality.

10. The barcode reading system of claim 9, wherein the one or more operations comprise one or more of convolution, binning, sub-sampling, rotating, windowing, and cropping.

11. The barcode reading system of claim 9, wherein the image data records comprise fewer pixels than the image frames.

12. The barcode reading system of claim 9, wherein the pre-processing circuitry is additionally configured to effect transfer to the image decoding system of the image data records that satisfy a threshold quality level and to discard the image data records that do not satisfy the threshold quality level without transferring them to the image decoding system.

13. The barcode reading system of claim 12, wherein the pre-processing circuitry is additionally configured to determine whether the image data records satisfy the threshold quality level and wherein determining whether an image data record satisfies the threshold quality level comprises:

determining whether a sharpness of the image data record exceeds a sharpness threshold; and determining whether a contrast of the image data record exceeds a contrast threshold.

14. The barcode reading system of claim 9, wherein effecting transfer of the at least some of the image data records comprises at least one of:

directly sending the at least some of the image data records to the image decoding system; or taking an action that causes the at least some of the image data records to be sent to the image decoding system.

15. The barcode reading system of claim 9, wherein the pre-processing circuitry is additionally configured to set image capture parameter values for the photo sensor array.

16. The barcode reading system of claim 9, wherein:

the pre-processing circuitry does not set image capture parameter values for the photo sensor array; and the barcode reading system further comprises an automatic gain control system that sets the image capture parameter values for the photo sensor array.

17. A barcode reading system, comprising:

an image decoding system comprising a processor, memory, and a decoder stored in the memory;

a communication interface;

a camera coupled to the image decoding system via the communication interface, the camera comprising a photo sensor array configured to capture image frames at a frame rate, wherein the communication interface is not capable of transferring the image frames to the image decoding system at the frame rate; and circuitry configured to selectively transfer one or more image data records to the image decoding system, wherein the one or more image data records are based on one or more of the image frames and the one or more image data records include fewer pixels than the one or more of the image frames.

18. The barcode reading system of claim 17, wherein the one or more image data records satisfy a threshold quality level.

19. The barcode reading system of claim 18, wherein the threshold quality level comprises a sharpness threshold and a contrast threshold.

20. The barcode reading system of claim 17, wherein the circuitry is configured to dynamically adjust a rate of transferring image data records.

\* \* \* \* \*